(12) United States Patent
Hayashi et al.

(10) Patent No.: US 8,121,724 B2
(45) Date of Patent: Feb. 21, 2012

(54) TRANSFER SYSTEM, AND TRANSFER METHOD

(75) Inventors: Takao Hayashi, Aichi (JP); Hiroki Sone, Kyoto (JP); Toyokazu Kobayashi, Aichi (JP); Yoshinori Yamada, Aichi (JP); Akiya Inoue, Tokyo (JP); Masayuki Tsujino, Tokyo (JP); Hiromichi Kawano, Tokyo (JP)

(73) Assignees: Murata Kikai Kabushiki Kaisha, Kyoto-shi, Kyoto (JP); Nippon Telegraph and Telephone West Corporation, Osaka-shi, Osaka (JP); Nippon Telegraph and Telephone Corporation, Tokyo (JP)

( * ) Notice: Subject to any disclaimer, the term of this patent is extended or adjusted under 35 U.S.C. 154(b) by 663 days.

(21) Appl. No.: 12/300,025

(22) PCT Filed: Apr. 25, 2007

(86) PCT No.: PCT/JP2007/058923
§ 371 (c)(1),
(2), (4) Date: Nov. 7, 2008

(87) PCT Pub. No.: WO2007/132650
PCT Pub. Date: Nov. 22, 2007

(65) Prior Publication Data
US 2009/0193235 A1      Jul. 30, 2009

(30) Foreign Application Priority Data
May 12, 2006   (JP) ................... 2006-133262

(51) Int. Cl.
*G06F 7/00*      (2006.01)
*G06F 19/00*     (2011.01)
*B65G 47/90*     (2006.01)
*G01C 21/00*     (2006.01)

(52) U.S. Cl. ......... 700/228; 700/230; 700/112; 700/213
(58) Field of Classification Search .................. None
See application file for complete search history.

(56) References Cited

U.S. PATENT DOCUMENTS
2006/0051192 A1* 3/2006 Fujiki ........................... 414/626

FOREIGN PATENT DOCUMENTS
JP            09-7912 A      1/1997
(Continued)

OTHER PUBLICATIONS

Japanese Office Action dated Apr. 28, 2011, issued in corresponding Japanese Patent Application No. 2008-515476.

(Continued)

*Primary Examiner* — Gene Crawford
*Assistant Examiner* — Yolanda Cumbess
(74) *Attorney, Agent, or Firm* — Westerman, Hattori, Daniels & Adrian, LLP

(57) ABSTRACT

In response to a transfer request, for which a loading time at a transfer source and a loading time at a transfer target are designated by a production controller, there is created a transfer scenario, which contains a basic transfer (From) from the transfer source to a buffer near the transfer target, for example, and a basic transfer (To) from the buffer to the transfer target. In order that the basic transfers (From, To) may be able to be executed, the buffer is reserved, and a transfer vehicle is allocated. The time period for the transfer vehicle to run to the transfer source or the buffer and the time period for the transfer vehicle to run from the transfer source or the buffer are estimated to assign a transfer command to the transfer vehicle. The possibility that the loading and the loading time may deviate from a designated period is evaluated. In case this possibility is high, a production controller is informed that a just-in-time transfer is difficult.

8 Claims, 18 Drawing Sheets

FOREIGN PATENT DOCUMENTS

| | | |
|---|---|---|
| JP | 2000-195918 A | 7/2000 |
| JP | 2001-296922 A | 10/2001 |
| JP | 2002-229635 A | 8/2002 |
| JP | 2003-347388 A | 12/2003 |
| JP | 2004-281622 A | 10/2004 |
| JP | 2000-091401 A | 3/2008 |

OTHER PUBLICATIONS

International Search Report of PCT/JP2007/058923, Mailing Date of Jul. 24, 2007.

* cited by examiner

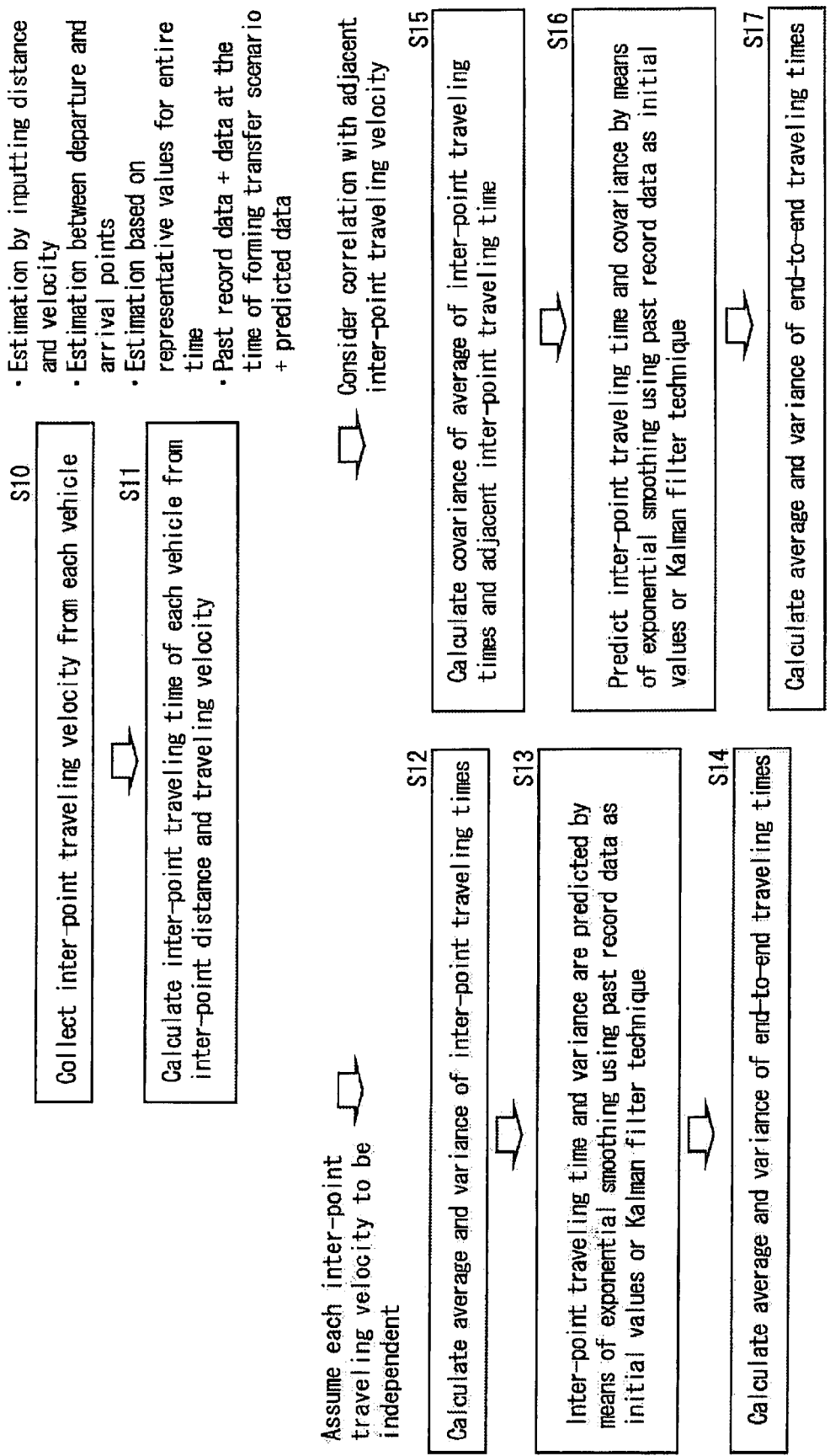

FIG. 11

Edit inter-point traveling time collected in term T

| Point pair | Observed value (inter-point traveling time) |
|---|---|
| 1-2 | 10, 7, 9, 11, 8, 9, 10 |
| 1-3 | 20, 21, 18, 17, 22, 19 |
| 1-4 | 5, 6, 4, 7, 3 |

Calculation of average and variance

| Point pair | Observed value (inter-point traveling time) | Average | Variance |
|---|---|---|---|
| 1-2 | 10, 7, 9, 11, 8, 9, 10 | 9.1 | 1.8 |
| 1-3 | 20, 21, 18, 17, 22, 19 | 19.5 | 3.5 |
| 1-4 | 5, 6, 4, 7, 3 | 5.0 | 2.5 |

Prediction of traveling time between respective points

Example
If predicted value of average value of traveling times between points 1 and 2 in term T is 8 seconds, measured value of average value of traveling times between points 1 and 2 in term T is 9.1 seconds, and smoothing coefficient $\alpha = 0.5$, predicted value in term T + 1 is
$0.5 \times 8 + (1 - 0.5) \times 9.1 = 8.55$

---

S20 — Collect inter-point traveling times from each vehicle

S21 — Sort traveling times from data collected in term T by point pair

S22 — Calculate average and variance of inter-point traveling times

S23 — Predict average of traveling times to transfer source by means of exponential smoothing
$A_{ij}(T+1) = \alpha A_{ij}(T) + (1-\alpha) A*_{ij}(T)$
$A_{ij}(T+1)$: predicted value of average of traveling time between points i and j in term T + 1
$A_{ij}(T)$: predicted value of average of traveling time between points i and j in term T predicted in term T − 1
$A*_{ij}(T)$: record value of average of traveling time between points i and j in term T
$\alpha$: smoothing coefficient ($0 < \alpha < 1$)

FIG. 12

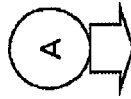

S24: Predict variance of inter-point traveling times by exponential smoothing
Vij(T + 1) = αVij(T) + (1 − α)V*ij(T)
Vij(T + 1): predicted value of variance of traveling times between points i and j in term T + 1
V*ij(T): record value of variance of traveling times between points i and j in term T
α: smoothing coefficient. (0 < α < 1)

Example
If predicted value of variance of traveling times between points 1 and 2 in term T is 2 seconds, measured value of average value of traveling time between points 1 and 2 in term T is 1.8 seconds, and smoothing coefficient α = 0.5, predicted value in term T + 1 is
0.5 × 2 + (1 − 0.5) × 1.8 = 1.9

S25:
· Assumption: inter-point traveling times are independent from each other
· Input: predicted values of average and variance of inter-point traveling time in term T + 1
· Output: predicted values of average and variance of end-to-end traveling time in term T + 1
· Processing
  · Average of end-to-end traveling times = sum of averages of inter-point traveling times
  · Variance of end-to-end traveling times = sum of variances of inter-point traveling times Example
If average value of traveling times between points i and j is Aij, average value A15 of traveling times between points 1 to 5 is given by the following expression.
A15 = A12 + A23 + A34 + A45
If variance of traveling times between points i and j is Vij, variance V15 of traveling times between points 1 and 5 is given by the following expression.
V15 = V12 + V23 + V34 + V45

FIG. 13

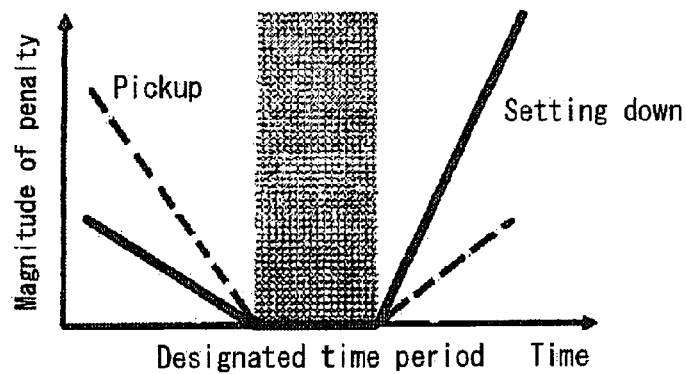

FIG. 14

Calculate smallest value of evaluation value C1(T)

$$C1(T) = \int_{0}^{+\infty} f1_i(t)g(t+T-t_0)dt$$

$g(t)=-a_1t+a_1t_e \ (t \leq -t_e)$
$g(t)=0 \ (-t_e \leq t \leq t_e)$
$g(t)=a_2t-a_2t_e \ (t_e \leq t)$ where
C1(T): evaluation value
F1i(t): distribution of time at which empty vehicle arrives at transfer source i (assume normal distribution)
g(t): penalty function
t0: target arrival time
T: transfer start time

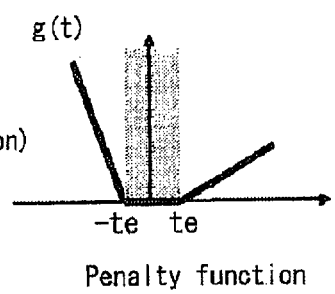

Penalty function

FIG. 16

OHB data management table

| OHB No. | $t_1$ | $t_2$ | $t_3$ | $t_4$ | $t_5$ | $t_6$ | $t_7$ |
|---------|-------|-------|-------|-------|-------|-------|-------|
| 1 | $FT_4$ | $FT_4$ | $FT_4$ | Empty | Empty | $FT_1$ | $FT_1$ |
| 2 | Empty | Empty | $FT_2$ | $FT_2$ | $FT_2$ | $FT_2$ | $FT_2$ |
| 3 | $FT_3$ | $FT_3$ | $FT_3$ | $FT_3$ | | | |
| ...... | | | | | | | |

48

OHB2
· will not be used at times t1 to t2
· will be used at times t3 to t7 in scenario FT2

OHB3
· will be used at times t1 to t4 in scenario FT3
· is already used at times t1 to t2
· will be continuously used at times t3 to t4
· will not be used at and after time t5

FIG. 19

Arrival time of vehicle for pickup

| Bay No. | $t_1$ | $t_2$ | $t_3$ | $t_4$ | $t_5$ | ... |
|---|---|---|---|---|---|---|
| 1 | 0 | 1 | 0 | 2 | 0 | |
| 2 | 0 | 1 | 1 | 1 | 1 | |
| 3 | 0 | 2 | 1 | 2 | | |
| ...... | | | | | | |

Indicated is that two vehicles are scheduled to arrive at departure point in bay 3 at time t4 for pickup

Setting down finish time

| Bay No. | $t_1$ | $t_2$ | $t_3$ | $t_4$ | $t_5$ | ... |
|---|---|---|---|---|---|---|
| 1 | 0 | 2 | 0 | 0 | 1 | |
| 2 | 1 | 0 | 1 | 0 | 1 | |
| 3 | 2 | 0 | 1 | 1 | 0 | |
| ...... | | | | | | |

Indicated is that one vehicle will finish setting down and become empty at departure point in bay 3 at time t4

⇒

Management table for the number of allocated vehicles

| Bay No. | $T_1$ | $T_2$ | $T_3$ | $T_4$ | $T_5$ | ... |
|---|---|---|---|---|---|---|
| 1 | 0 | 1 | 0 | 2 | 1 | |
| 2 | 0 | 1 | 1 | 1 | 1 | |
| 3 | 0 | 2 | 1 | 1 | 0 | |
| ...... | | | | | | |

50

Indicated is that the number of vehicles to be newly required in bay 1 in term T4 is two (the number of vehicles to be required and the number of vehicles to become empty in bay 1 in term T4 are obtained from Tables 1 and 2 and a difference therebetween is given)

TRANSFER SYSTEM, AND TRANSFER METHOD

TECHNICAL FIELD

The present invention relates to a transfer system using transfer vehicles such as overhead traveling vehicles, floor-traveling rail guided vehicles, or auto-guided vehicles, and particularly to carrying out pickup and setting down within a designated time period to minimize a waiting time for a loading and unloading port or a station.

BACKGROUND ART

Described in Patent Document 1 (Japanese Laid-Open Patent Publication No. 2001-296922) and Patent Document 2 (Japanese Laid-Open Patent Publication No. 2004-281622) are to predict a time when articles can be picked up at a loading and unloading port or the like and to control a transfer vehicle so that it arrives at the loading and unloading port at the time. However, this is not enough to allow the transfer vehicle to arrive at the loading and unloading port for pickup at the designated time. Especially when a traveling distance to a transfer destination is long, it is difficult to accurately predict a required traveling time.

DISCLOSURE OF THE INVENTION

Problems to be Solved by the Invention

It is an object of the present invention to transfer an article to a transfer destination loading and unloading port at a designated time.

It is a subsidiary object of the invention to transfer the article to the transfer destination loading and unloading port at the designated time even if a transfer distance is long.

It is a subsidiary object of the invention to more reliably transfer the article to the transfer destination loading and unloading port at the designated time by optimizing (a) stopover buffer(s).

It is a subsidiary object of the invention to transfer the article to the transfer destination loading and unloading port at the designated time even if various factors such as a delay in transfer to the buffer and congestion in a transfer route arise.

It is a subsidiary object of the invention to accurately determine whether or not the article can be transferred to the transfer destination loading and unloading port at the designated time.

Means for Solving the Problems

The present invention is a transfer system including a plurality of transfer vehicles for transferring an article between a plurality of processing devices, a buffer for storing the article transferred between the processing devices, and a controller for allocating an article transfer instruction to the transfer vehicles, the system including transfer instruction forming means for forming a first transfer instruction from the transfer source processing device to the stopover buffer and a second transfer instruction from the stopover buffer to the transfer destination processing device when a transfer request for which an arrival time at the transfer destination processing device is designated is issued and allocation means for obtaining a time to start traveling of the transfer vehicle and for allocating the second transfer instruction to the transfer vehicle at the time so that the article arrives at the transfer destination processing device at the designated arrival time.

Moreover, the invention is a transfer method for transferring an article between a plurality of processing devices by a plurality of transfer vehicles, temporarily storing the article transferred between the processing devices in a buffer, and allocating an article transfer instruction to the transfer vehicles by a controller, the controller including transfer instruction forming means and allocation means, the transfer instruction forming means forming a first transfer instruction from the transfer source processing device to the stopover buffer and a second transfer instruction from the stopover buffer to the transfer destination processing device when a transfer request for which an arrival time at the transfer destination processing device is designated is issued and allocation means obtaining a time to start traveling of the transfer vehicle and allocating the second transfer instruction to the transfer vehicle at the time so that the article arrives at the transfer destination processing device at the designated arrival time.

Description of the transfer system holds true of the transfer method.

Preferably, the buffers being provided in a plurality of positions along a traveling route for the transfer vehicles, the transfer instruction forming means dividing the second transfer instruction into a plurality of parts so as to transfer the article to the transfer destination processing device via the plurality of stopover buffers, and the allocation means obtaining times to start traveling of the transfer vehicles for the respective parts of the second transfer instruction so that the article arrives at the respective stopover buffers before pickup times of the article from the stopover buffers and that the article arrives at the transfer destination processing device at the designated arrival time and allocating the respective parts of the second transfer instruction to the transfer vehicles at the times.

Preferably, the buffers being provided in a plurality of positions along a traveling route for the transfer vehicles, the transfer instruction forming means selecting the stopover buffers from the buffers according to a predetermined condition.

Preferably, revising means for determining whether or not the article can arrive at the transfer destination processing device at the designated arrival time according to an execution status of the first transfer instruction or a condition of the transfer system and for correcting the second transfer instruction when the article cannot arrive is provided.

Preferably, predicting means for predicting a time at which the article arrives at the transfer destination processing device and distribution of the time and evaluating means for evaluating an expected value of a deviation from the designated arrival time based on the predicted arrival time and distribution are provided, the transfer instruction forming means forming the second transfer instruction so that the evaluation satisfies a predetermined condition.

Effects of the Invention

In the present invention, the transfer request is divided into the first transfer instruction and the second transfer instruction. Extra time included between issue of the transfer request and the arrival time at the transfer destination processing device is consumed at the stopover buffer. The second transfer instruction is allocated to the transfer vehicle so that the vehicle arrives at the destination processing device at the designated time. For example, if the transfer vehicle arrives at the stopover buffer and the second transfer instruction is allocated to the transfer vehicle at such a time that the transfer vehicle arrives at the transfer destination processing device at the designated time on average, variation in the arrival time is determined by a traveling distance, traveling time and the like from the stopover buffer to the transfer destination processing device. Because the stopover buffer can be disposed in a vicinity of the transfer destination processing device, it is possible to reduce the variation in the arrival time as compared with a case where the article is transferred from the transfer source to the transfer destination in one step. Even if congestion in the traveling route and other uncertain factors occur, it is possible to transfer the article to the transfer destination processing device substantially exactly at the designated time. As a result, it is possible to carry in the article at a time when a production system requires it and the transfer system can supply enhanced service to a production system.

If the transfer distance is long, it may be more efficient to use three or more transfer vehicles and the plurality of stopover buffers in some cases than to use only two transfer vehicles and keep the article at the stopover buffer in the vicinity of the transfer destination processing device for a long time. In this case, by obtaining times to start traveling of the transfer vehicles for the respective parts of the second transfer instruction so that the article arrives at the respective stopover buffers before pickup times of the article from the buffers and that the article arrives at the transfer destination processing device at the designated time and by allocating the respective parts of the second transfer instruction to the transfer vehicles, the article can arrive at the final transfer destination at the designated time. Variation factors during the second transfer can be absorbed by changing the times to pick up the article from the respective buffers, i.e., changing the times to start traveling of the transfer vehicles.

The stopover buffers are selected according to the predetermined condition. For example, the buffer to be selected is one a traveling distance or a traveling time of which to the transfer destination processing device is short, i.e., which is near an upstream side of the transfer destination processing device and which can be used for a period allowing for variations in the arrival times of the transfer vehicles before and after time between a setting-down time in the first transfer instruction and a pickup time in the second transfer instruction. In this way, it is possible to reduce the variation in the arrival time at the transfer destination processing device.

After the start of the first transfer instruction and preferably before the start of the second transfer instruction, whether or not the second transfer instruction can be executed according to a schedule is revised and the second transfer instruction is corrected. In an extreme case, the transfer vehicle that is executing the first transfer instruction is caused to continue to transfer the article to the transfer destination processing device. In this way, the article can arrive at the transfer destination processing device at the designated time in spite of factors that are difficult to predict such as congestion in the traveling route.

If the predicting means for predicting the time at which the article arrives at the transfer destination processing device and distribution of the time and the evaluating means for evaluating the expected value of the deviation from the designated arrival time based on the predicted arrival time and distribution are provided and the transfer instruction forming means forms the second transfer instruction so that the evaluation satisfies the predetermined condition, it is possible not only to make the expected value of the arrival time coincide with the designated time but also to keep the distribution of the arrival time within tolerance close to the designated time.

BRIEF DESCRIPTION OF THE DRAWINGS

FIG. 10 is a view showing a calculation algorithm of an average and a variance of end-to-end traveling times in the embodiment.

FIG. 11 is a flow chart showing a prediction algorithm of prediction and a variance of the end-to-end traveling times in the embodiment.

FIG. 12 is a flow chart showing the prediction algorithm of prediction and a variance of the end-to-end traveling times after a connector A in FIG. 11.

FIG. 13 is a graph showing an example of a penalty function for an error in an arrival time with respect to a designated time period in the embodiment.

FIG. 14 is a view showing evaluation of a predicted arrival time at a transfer source in the embodiment.

FIG. 16 is a view schematically showing a buffer management table in the embodiment.

FIG. 19 is a view schematically showing a management table for the number of allocated vehicles in the embodiment.

Figure 1:
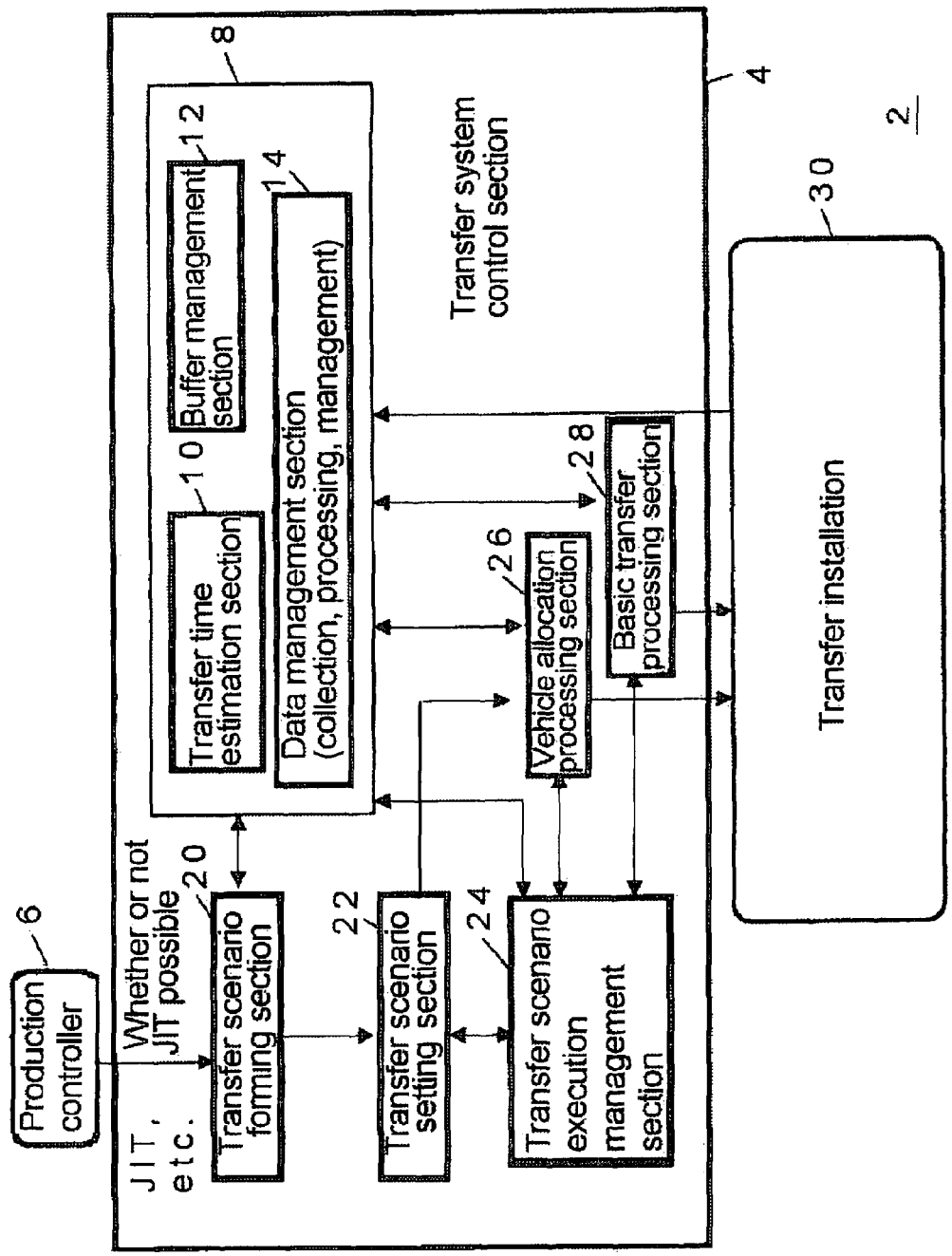
FIG. 1 is a block diagram of a control system of a transfer system of an embodiment.

DESCRIPTION OF REFERENCE NUMERALS 2 transfer system
4 control system
6 production controller
8 management section
10 transfer time estimation section
12 buffer management section
14 data management section 20 transfer scenario forming section
22 transfer scenario setting section
24 transfer scenario execution management section
26 vehicle allocation processing section
28 basic transfer processing section
30 transfer installation
32 inter-bay route
34 intra-bay route
35 processing device
36 overhead traveling vehicle
38 buffer
40 transfer scenario
42, 43 transfer time record data
44 transfer scenario management table
46 transfer time record database
48 overhead buffer management table
50 management table for the number of allocated vehicles

BEST MODE FOR CARRYING OUT THE INVENTION

The most suitable embodiment for carrying out the present invention will be described below.

Embodiment

FIGS. 1 to 23 show a transfer system 2 of the embodiment by taking an overhead traveling vehicle system for example. In each drawing, reference numeral 4 designates a control system for communicating with an external controller such as a production controller 6 to receive a transfer request. Especially in a case of a JIT (just-in-time) transfer request, a pickup or setting-down time period is designated. The control system 4 reports whether or not the JIT transfer is possible and an execution status of a transfer instruction to the production controller 6. If the JIT transfer is impossible, the production controller 6 makes the same request again as another transfer request such as a priority transfer and a normal transfer.

A management portion 8 includes a transfer time estimation section 10, a buffer management section 12, and a data management section 14. The transfer time estimation section 10 accumulates records of transfer times of an overhead traveling vehicle and stores averages, standard deviations, and the like of the transfer times between points, bays, and the like. The transfer time estimation section 10 outputs estimated values of traveling times from a current position of the overhead traveling vehicle to a traveling destination pickup point, setting-down point, and the like, predicted values of variation (distribution) of the traveling times, e.g., standard deviations of estimated values of distribution of the traveling times and outputs evaluation values on deviations from designated arrival times in response to inquiries from a transfer scenario forming section 20, a transfer scenario execution management section 24, and the like. The buffer management section manages occupied/empty states of a buffer, a storage shed, and the like in the transfer system 2 and reserves the buffer and the storage shed for the transfer instruction and for basic transfer especially in a case of the JIT transfer. The data management section 14 is a database for collecting, analyzing, and managing various data in the transfer system 2. The transfer times out of the data are managed by a database of the transfer time estimation section 10.

The transfer scenario forming section 20 forms a transfer scenario for the JIT transfer. For the priority transfer and the normal transfer other than the JIT transfer, a transfer instruction forming section and an execution management section may be provided separately or the normal transfer may be processed as JIT transfer for which longer time periods are designated as a pickup time and a setting-down time. The priority transfer may be regarded as JIT transfer in which the earlier the pickup time and the setting-down time, the better, and a penalty increases steadily with the passage of time since allocation of the transfer request, i.e., allocation of the transfer instruction to the transfer vehicle such as the overhead traveling vehicle. The transfer scenario for the JIT transfer is formed of a first transfer instruction (basic transfer "From") from a transfer source to the buffer and a second transfer instruction (basic transfer "To") from the buffer to a transfer destination. The number of the basic transfers increases as the number of stopover buffers increases. If it is close to the designated setting-down time, a direct transfer without stopping over at the buffer is selected. Schedules for the respective basic transfers (basic transfer "To", basic transfer "From") are formed by the transfer scenario forming section 20.

A transfer scenario setting section 22 accumulates the transfer scenarios while asking a vehicle allocation processing section 26 to allocate vehicles so that an empty overhead traveling vehicle exists where and when needed. An execution status of the set transfer scenario is managed by the transfer scenario execution management section 24. If the execution status does not meet the schedule for the basic transfer, the transfer scenario is revised. In an extreme case, the JIT transfer is impossible and changed to the normal transfer or the like and the production controller 6 is informed of the change. In this case, the production controller 6 is also informed of the latest estimated pickup or setting-down time. A basic transfer processing section 28 allocates the transfer instruction to the overhead traveling vehicle at a predetermined time and the buffer management section 12 reserves a shelf of the optimum buffer to carry out the basic transfer.

Figure 2:
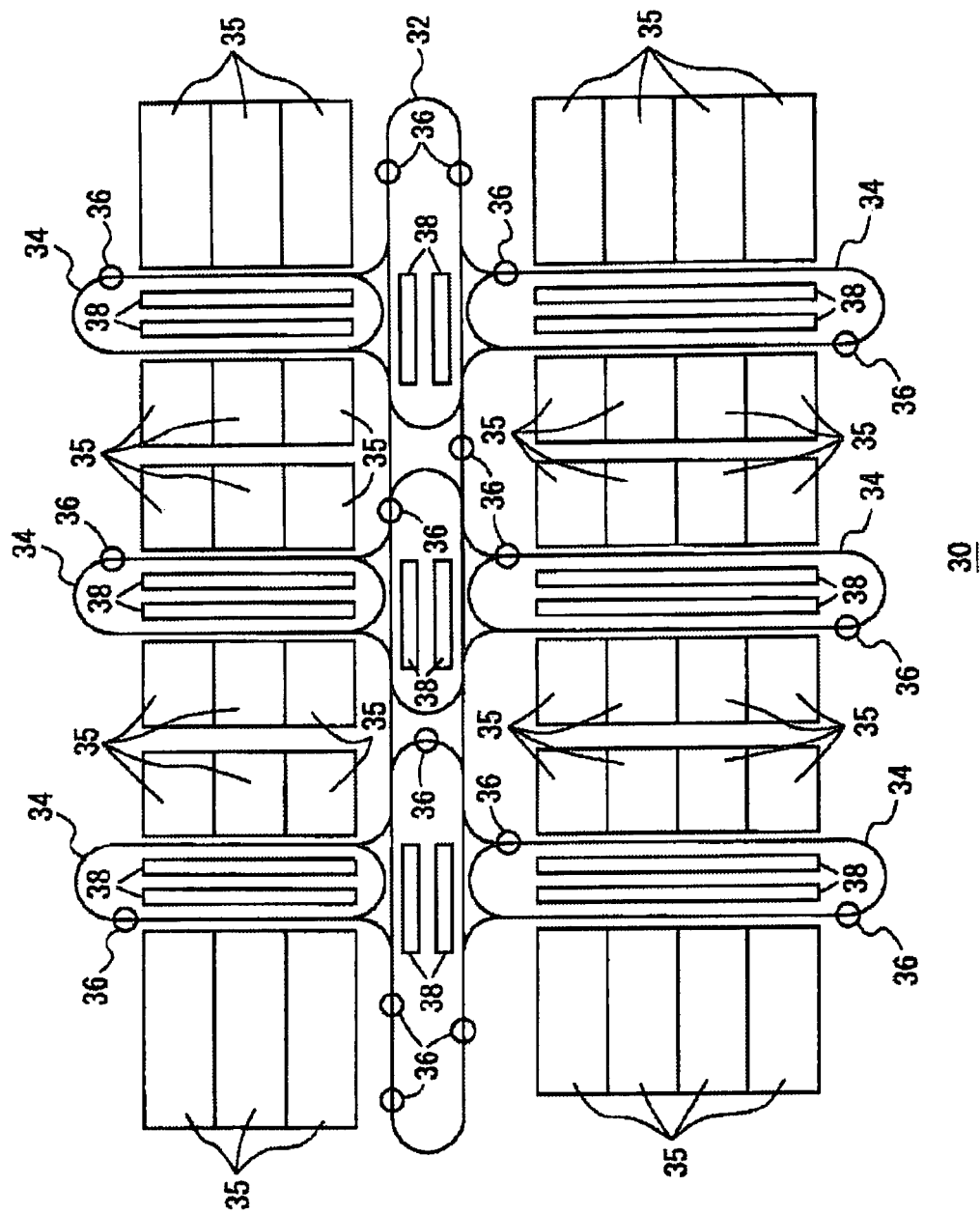
FIG. 2 is a plan view of a layout of a transfer installation of the embodiment.

A transfer installation 30 includes the overhead traveling vehicles 36, the buffers 38, an inter-bay route 32, and intra-bay routes 34 shown in FIG. 2. The buffers 38 may be overhead buffers (OHB) to and from which an article is directly delivered and received from and to the overhead traveling vehicles 36 or may be buffers below the routes 32, 34. In the following description, the overhead buffers are taken for example. The overhead traveling vehicle 36 is provided with a mechanism for moving a hoist (elevation frame) for handing and receiving the article from a position directly below to a position beside a traveling rail so as to be able to hand and receive the article to and from the overhead buffer provided beside the traveling rail. In this way, a large number of overhead buffers can be installed and the overhead buffers can be provided in suitable positions for the JIT transfer without being affected by the layout of loading and unloading ports and the like. The inter-bay route 32 and the intra-bay routes 34 are collectively called the "traveling route" and the intra-bay routes 34 may be simply called "bays" in some cases where there is no possibility of misunderstanding. The plurality of overhead traveling vehicles 36 and the buffers 38 are provided and especially the buffers 38 are provided for the plurality of articles at each of the intra-bay routes 34 and the inter-bay route 32.

To reserve the buffer means to reserve one shelf of the buffer. It is also possible to use a storage shed having a stocking and delivering device such as a stacker crane instead of the buffer. However, a distance from the storage shed to a transfer destination processing device is long in general and time for operation of the stocking and delivering device is needed. Therefore traveling time from the storage shed to the processing device varies widely. Consequently, the storage shed is not suitable for the JIT transfer and the buffer is preferable. The traveling route is provided with a large number of shortcuts and bypasses in case of trouble of the traveling rail or to avoid the congestion and partially has two tracks for use in waits and overtaking involved in the vehicle allocation. Illustration in FIG. 2 is simplified as compared with an actual route.

The plurality of processing devices 35 are provided to face the intra-bay routes 34. One or more loading and unloading ports below the traveling rail of the intra-bay route 34 are provided to the processing device 35 and hand and receive the articles such as semiconductor cassettes to and from the overhead traveling vehicles 36. The processing device 35 also includes an inspection device and the like. Both the transfer source (a start point and represented by "From") and transfer destination (represented by "To") are loading and unloading ports in principle. Terms used in the embodiment will be described below.

Table 1 Terms

Just-in-time transfer (JIT transfer): Transfer in which a pickup time at a transfer source or a setting-down time at a transfer destination is designated; the designated time is normally given as a time period (designated time period).

Transfer scenario: A scenario (plan) for a transfer to comply with transfer request data; in a case of the JIT transfer, the scenario is formed of at least two steps, i.e., the basic transfer "From" from the transfer source to an intermediate buffer and the basic transfer "To" from the intermediate buffer to the transfer destination. If the number of intermediate buffers to stop over at is two or greater, the number of the basic transfers is greater than two. The basic transfer is a unit of transfer that cannot be divided any more and includes steps of transfer vehicle's traveling to the loading and unloading port or the buffer (storage shed) at the pickup point, pickup, and setting down at the loading and unloading port, the buffer, or the storage shed at the setting-down point. If the basic transfer is divided into travel and transfer in the description, the pickup and setting down are regarded as parts of the transfer. In this case, the basic transfer is divided into two, i.e., the empty "travel" without the article and the "transfer" handling the article.

Table 2 Terms (Continued)

Transfer request: A request from the controller such as the production controller outside the transfer system to transfer the article; an instruction from a controller in the transfer system to the transfer vehicle, by contrast, is a transfer instruction. Check of progress following the transfer instruction by a transfer vehicle controller is referred to as tracking. A report on a state of transfer from the transfer vehicle controller to the external controller is referred to as a "transfer report". There are three kinds of transfer requests, i.e., a JIT transfer request, a priority transfer request, and a normal transfer request, but all of them may be made as the JIT transfer request.

JIT transfer request: A transfer request for which a time (time period) for at least one of pickup at the transfer source and setting down at the transfer destination is designated; by achieving the JIT transfer, efficiency of a semiconductor processing device and the like increases and productivity is expected to increase.

Normal transfer request: A transfer request without designated time and ordering of priority or a lowest-priority transfer request.

Priority transfer request: A request without special designated time but having higher priority than the lowest priority. The request has precedence over the normal transfer request. The order in which the JIT transfer request and the priority transfer request are executed is not defined uniformly. If it is close to the time designated by the JIT transfer request, the JIT transfer request takes precedence. If there is extra time until the time designated by the JIT transfer request, the priority transfer request takes precedence.

Table 3 Terms (Continued)

Basic transfer processing: Processing in the control system for carrying out the basic transfer and is, for example, formed of
- transfer vehicle allocation for instructing a transfer vehicle to execute a specific basic transfer,
- traveling route search for determining a traveling route fro the basic transfer and correction of the traveling route
- travel of the transfer vehicle to a transfer source loading and unloading port or buffer,
- pickup of an article at the transfer source loading and unloading port or buffer,
- travel of the transfer vehicle to a transfer destination,
- congestion avoidance for determining or changing a traveling route so as to avoid congestion in the traveling route, and
- setting down of the article at the transfer destination.

JIT achievement ratio: A ratio of success in transfer at the designated time to the JIT transfer requests; deviation from the designated time is evaluated based on a penalty function and a time difference from the designated time.

Average value determination: A method for determining whether or not the JIT transfer is possible based on an average value of past record data; in the embodiment, an average value and a variance of the past record date are used to evaluate the possibility of achievement of JIT transfer by obtaining a composition product with a penalty function and whether or not the JIT transfer is possible is determined based on the evaluation in the embodiment.

Insured accuracy specification determination: Determination of whether or not the possibility of the JIT transfer exceeds a specified percentage, the possibility obtained from the past record data.

Table 4 Terms (Continued)

Direct transfer: A direct transfer from the transfer source to the transfer destination without stopping over at the buffer; the direct transfer is a part of the JIT transfer on condition that the transfer is carried out at the designated time.

Schedule of the basic transfer: A schedule for every kind of timing in the basic transfer; the schedule is formed of a start time of the basic transfer (allocation to the transfer vehicle), a transfer vehicle arrival time at the transfer source estimated from the basic transfer start time, an estimated value of pickup finish time at the transfer source, and an estimated value of transfer vehicle arrival time at the transfer destination, an estimated value of setting-down finish time at the transfer destination, and the like. The transfer source and the transfer destination may be the loading and unloading ports or the buffers.

Estimated time From: An estimated time from the start of the basic transfer to the finish of the pickup of the transferred article.

Estimated time "To": An estimated time from the start of the basic transfer to the finish of setting down of the transferred article.

Estimated time "−From", Estimated time "+From": An estimated time from the start of the basic transfer to the finish of the pickup at the transfer source X allowing for risk factors of −(early), +(late); an estimated time "−To" and an estimated time "+To" are defined similarly.

Buffer: A place where the transfer system temporarily stocks articles and includes a storage shed having a stocking and delivering device such as a stacker crane in a broad sense.

In principle, it means a buffer which is provided along the traveling route and from and to which the transfer vehicle directly receives and delivers the article. Out of the buffers, ones provided parallel to the traveling route and on a ceiling portion are overhead buffers (OHB).

Transfer vehicle: An overhead traveling vehicle, a floor-traveling rail guided vehicle, or a rail-less floor traveling auto-guided vehicle referred to as a vehicle in some cases.

The available number of transfer vehicles: The number of empty transfer vehicles to which the basic transfers can be allocated at a certain time. The number is counted for each bay.

Figure 3:
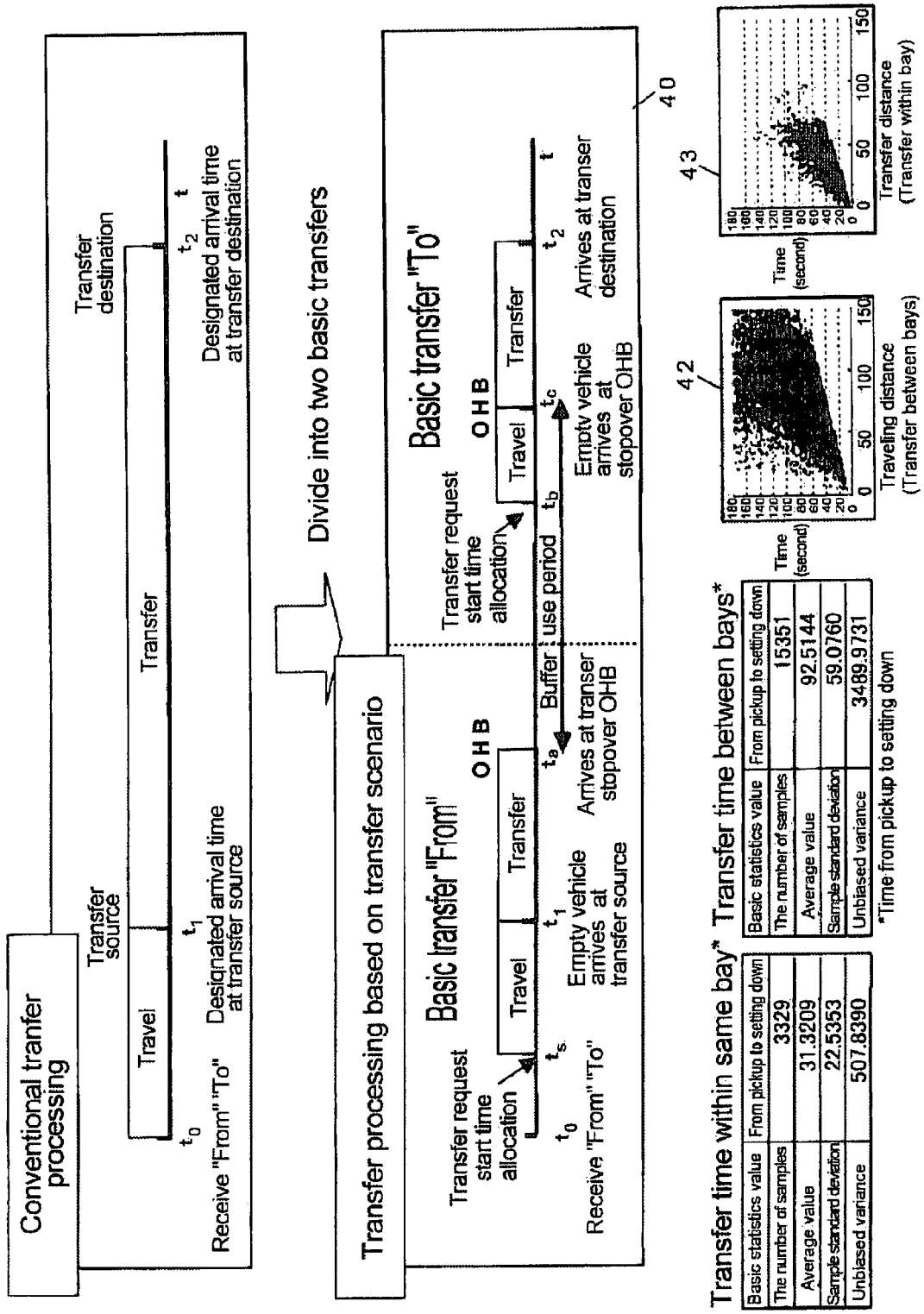
FIG. 3 is a view for describing "a transfer scenario" in the embodiment.

FIG. 3 shows a meaning of a transfer scenario 40. A transfer request is formed of "From" data and "To" data each of which includes a number of a loading and unloading port of a processing device, a lot number or an ID of an article, a designated arrival time, and the like. To enable a transfer vehicle such as an overhead traveling vehicle to arrive at a transfer source at a designated transfer source arrival time t1 and to enable a transfer vehicle to arrive at a transfer destination at a designated transfer destination arrival time t2 in response to the transfer request, a transfer instruction is allocated so that a transfer vehicle arrives at the transfer source at the designated time t1 and the vehicle transfers to an intermediate buffer. Then, a transfer instruction is allocated to another transfer vehicle, for example, so that the vehicle arrives at the transfer destination at the time t2. As a result, one transfer request is divided into the basic transfer "From" and the basic transfer "To". In a case of stopping over at a plurality of buffers at intermediate points, a basic transfer "Int" is added therebetween. As is apparent from the above description, a JIT transfer aims not at minimizing a transfer time but at avoiding a backlog of articles in a processing installation and minimizing a time for the processing installation to wait for an article. Even if a transfer time for each article is long, minimizing of the waiting time for the processing installation means that the transfer system supplies optimum service to a production system. If it is close to the designated transfer destination arrival time t2, the direct transfer may be carried out. The times t1, t2 are used as designated time periods having leeway in practice.

To achieve the JIT transfer, the transfer vehicles at least need arrive at a "From" position and a "To" position at the times t1, t2, which is based on the premise that traveling times of the transfer vehicles can be estimated accurately. For this purpose, the transfer time estimation section 10 in FIG. 1 stores transfer time record data 42, 43 in a lower portion of FIG. 3 in a database that returns a statistics value such as distribution of traveling time record values or an average and a standard deviation of the record values in response to a traveling distance or an intra-point or intra-bay argument.

Figure 4:
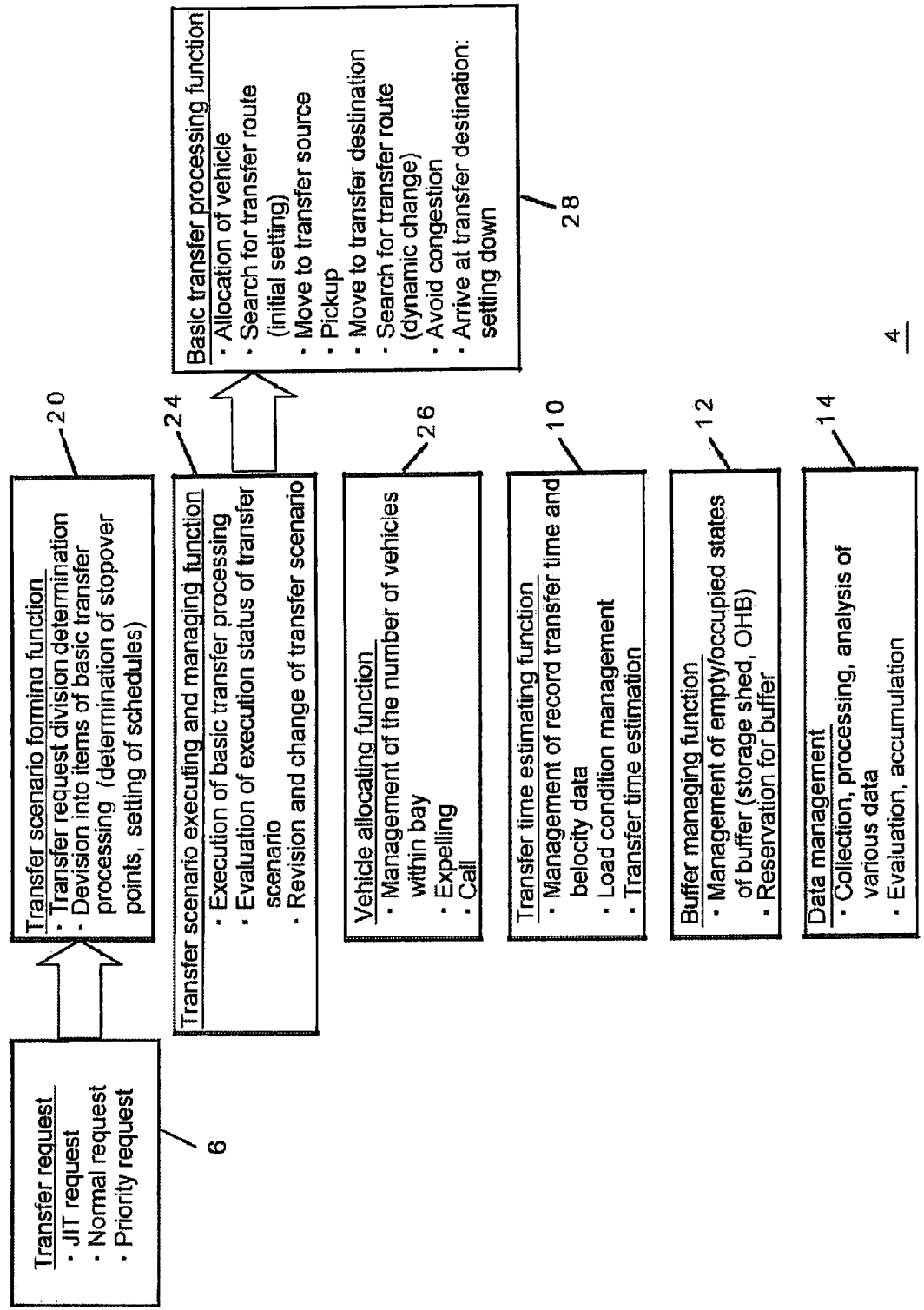
FIG. 4 is a view for describing the control system of the embodiment from a functional viewpoint.
Figure 5:
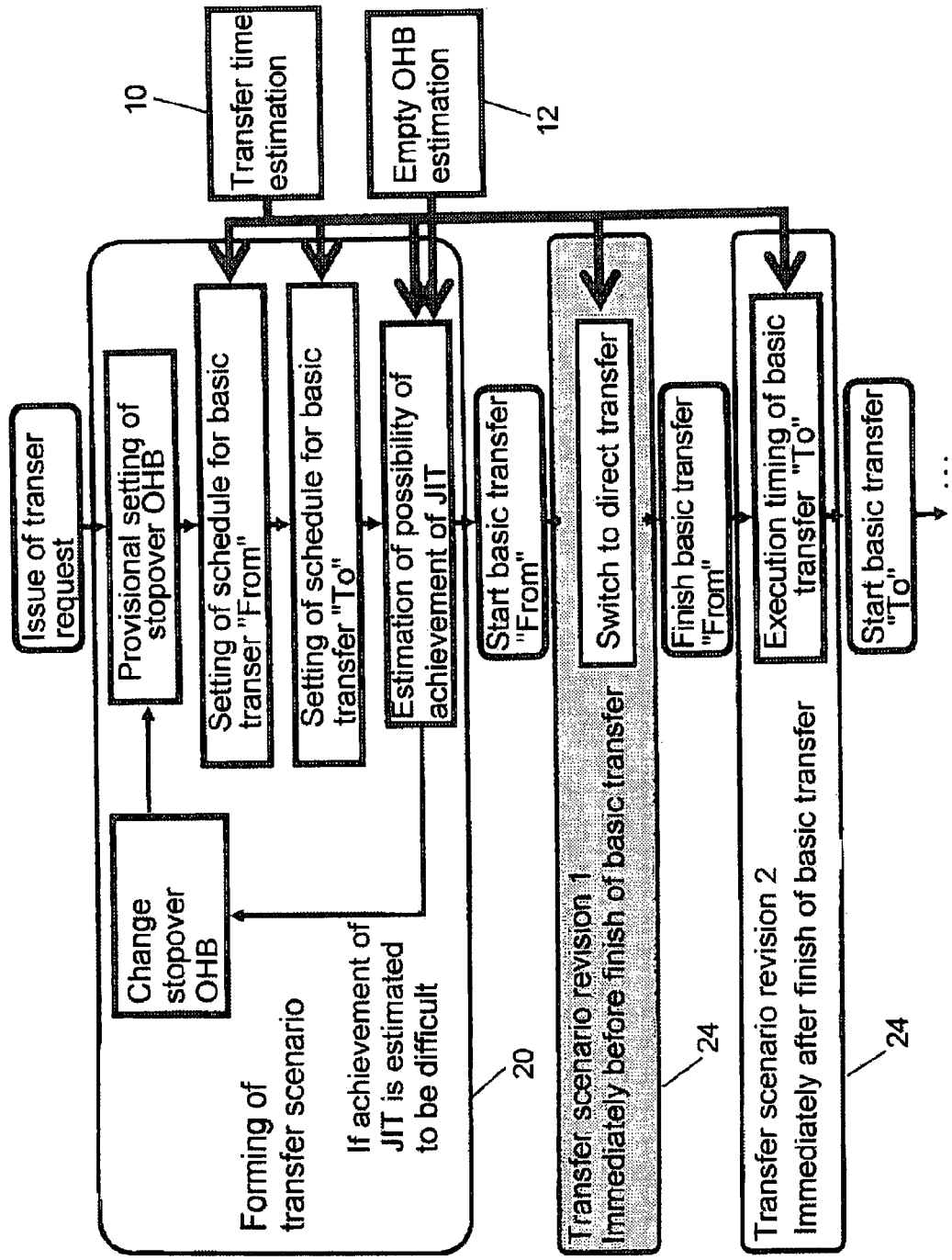
FIG. 5 is a chart showing procedures to form and revise the transfer scenario in the embodiment.

Functions for achieving the JIT transfer are shown in FIGS. 4 and 5. Reference numerals in the drawings correspond to those in FIG. 1 and designate places (means) for achieving the respective functions. A transfer scenario forming function is achieved by the transfer scenario forming section 20 that determines whether or not the JIT transfer is possible in response to the transfer request, divides the transfer request into the basic transfers when the JIT transfer is possible, determines the stopover buffer(s), and fixes schedules for the respective basic transfers.

To form the transfer scenario, (1) Whether or not the JIT transfer is possible is determined. Three determinations a, b, and c are made according to a request pattern of the JIT transfer.

(a) Determination whether or not the JIT transfer to a transfer source is possible.

(b) Determination whether or not the JIT transfer to a transfer destination is possible.

(c) Determination whether or not the JIT transfer to the transfer source and the transfer destination is possible.

(2) Whether or not the JIT transfer is possible is determined based on any of three options: a, b, and c.

(a) Average value determination: determine based on an average value of expected arrival times.

(b) Insured accuracy specification determination: determine based on whether or not there is a specified percent probability that a designated time is met.

(c) Determination based on a penalty function: determine the penalty function as a function of deviation (early arrival, late arrival) from the designated time and determine based on whether or not a penalty is a value not over a specified value.

(3) In the function of dividing and processing the JIT transfer request, one of methods is chosen to perform processing in each of function options, a, b, and c.

(a) A function of determining the number of stopovers: choose one method from options i to iv.

(i) Set a common value for every pair of a transfer source and a transfer destination.

(ii) Set an upper limit according to a distance between the transfer source and the transfer destination.

(iii) Set an upper limit according to a requested transfer time to the transfer destination.

(iv) Set an upper limit in consideration of a distance and a requested transfer time to the transfer destination.

If the transfer destination is far away, it is possible to stop over at a plurality of buffers. In this case, it is possible to reduce variation in the arrival time at a final transfer destination as compared with a case where the stopover buffer is fixed to one. In this case, an intermediate basic transfer "Int" is added and a transfer schedule for the basic transfer "Int" is determined on condition that setting down at a buffer in the last basic transfer is finished before a pickup time at the buffer and so that setting down at each buffer is finished before a pickup time at each buffer.

(b) A stopover buffer determining function: select one method from options i to v.

(i) Determine in consideration of only the distance to the transfer destination.

(ii) Determine in consideration of the transfer time to the transfer destination.

(iii) Determine the distance and the transfer time to the transfer destination.

(iv) Determine in consideration of the distance to the transfer destination and a load condition in a transfer destination bay.

(v) Determine in consideration of the transfer time to the transfer destination and the load condition in the transfer destination bay.

If the stopover buffer is far from the transfer destination or a route between them is congested, variation in the arrival time becomes great. By utilizing upstream one of buffers within the same bay in the vicinity of the transfer destination, it is possible to reduce the variation in the arrival time.

(c) A function of determining the load condition in the bay: select one method from options i, ii.

(i) Determine the load condition in the bay based on the number of transfer vehicles in the bay and an average velocity.

(ii) Determine the load condition in the bay based on the number of setting-down and pickup transfer vehicles in the bay at an assumed time according to the formed transfer scenario.

Determination of the load condition in the bay is utilized for estimation of the transfer time.

The transfer scenario forming section 20 preferably forms transfer scenarios in response to the priority transfer request and the normal transfer request other than the JIT transfer and forms the transfer scenario according to an evaluation function (penalty function) for the deviation from the designated arrival time when the evaluation function is specified in the JIT transfer. Therefore, the transfer scenario forming section 20 further has the following functions.

(1) Transfer scenario forming (four settings according to the request pattern of the JIT transfer are possible)

(a) A function of forming a scenario in response to a transfer request for which an arrival time at the transfer source is designated.

(b) A function of forming a scenario in response to a transfer request for which an arrival time at the transfer destination is designated.

(c) A function of forming a scenario in response to a transfer request for which arrival times at the transfer source and the transfer destination are designated.

(d) A function of forming a scenario in response to a priority transfer request.

(2) A scenario forming condition determining function (select one method from options a, b)

(a) A function of forming a scenario in response to a transfer request for which an arrival time and a percentage of tolerance of variation from a designated time are specified, e.g., arrival B % of the time within the designated time±A seconds.

(b) A function of forming a scenario in response to a transfer request in which a deviation from the arrival time is given as the evaluation function and an evaluation value is not over a designated value.

For the transfer scenario in execution, the transfer scenario execution management section 24 observes the transfer time and a state of congestion in the traveling path, detects a deviation of an observation value from a value estimated in forming the scenario, and revises the transfer scenario to correct the deviation. A transfer scenario revising function is performed by the transfer scenario execution management section 24 through the basic transfer processing section 28. The transfer scenario revising function has the following functions.

(1) A transfer scenario deviation detecting function: select one method from options a, b.

(a) Detect the arrival time and the deviation from the designated time based on percentages of the designated tolerance.

(b) Detect the arrival time and the deviation from the designated time based on values obtained from the evaluation function.

(2) A transfer scenario revision processing executing function: choose one method from options a, b.

(a) A function of periodically revising suspension of division, the number of stopovers, the stopover storage shed, the stopover overhead buffer(s), the transfer start time.

(b) A function of revising suspension of division, the number of stopovers, the stopover overhead buffer(s), the transfer start time when an vent occurs (finish of pickup or arrival at the stopover storage shed or the stopover overhead buffer)

Revision of the transfer scenario is the function to ensure that pickup and setting down are carried out at the designated times according to system conditions such as a delay in the basic transfer "From", congestion in the traveling route, and occupancy of the buffer.

The transfer scenario executing and managing function further includes an allocating time setting function. The allocating time setting function sets a time to allocate the transfer instruction (basic transfer) to the transfer vehicle. In response to the allocation, the transfer vehicle starts to travel to the pickup point. This function includes the following functions.

(a) A function of setting a transfer request start time (allocation) to the transfer source in response to the transfer request ("From" "To" data) for which the JIT transfer is designated.

(b) A function of setting a transfer request start time from the stopover storage shed or the stopover overhead buffer for the transfer request in response to which the transfer to the stopover storage shed or the stopover overhead buffer has been carried out.

The transfer vehicle immediately starts traveling to the pickup point in principle after the allocation. Therefore, arrival of the transfer vehicle at a predetermined position at a predetermined time is achieved by controlling the allocating time.

A buffer managing function is achieved by the buffer management section 12 that predicts empty/occupied states of the buffers such as the storage shed and the overhead buffer in the future and determines availability of the buffers to help form the transfer scenario. The section also reserves the buffer, selected as a stopover point in the transfer scenario, for a use period estimated in the transfer scenario. The buffer managing function manages not only current usage but also the time when a change in the empty/occupied state is expected due to execution of the formed transfer scenario. However, in some cases, the buffer management may be revised depending on presence or absence of a special buffer area that can be used by the JIT transfer request.

A transfer time estimating function is achieved by the transfer time estimation section 10. This function obtains an estimated transfer time at the point of estimation based on the current execution status of the transfer and the past execution status of the transfer. This function includes the following elements.

(1) A transfer time estimating function: choose one method from options a, b.

(a) Estimate the transfer time by inputting time
(Choose one method from options (i) & (iii), (i) & (iv), (ii) & (iii), (ii) & (iv))

(i) Estimation between bays: estimate from a representative value for a bay.

(ii) Estimation between points: estimate between departure and arrival points.

(iii) Entire time zone common estimation: estimation based on representative values for the entire time.

(iv) Estimation for each time zone: estimation based on a representative value for a designated time zone.

(b) Estimate the transfer time by inputting the distance and velocity.

(choose one method from options (i) & (iii), (i) & (iv), (ii) & (iii), (ii) & (iv))

(i) Estimation between bays: estimate from a representative value for a bay.

(ii) Estimation between points: estimate between departure and arrival points.

(iii) Entire time zone common estimation: estimation based on representative values for the entire time.

(iv) Estimation for each time zone: estimation based on a representative value for a designated time zone.

In each of (a) and (b), the transfer time and variation in it, e.g., a standard deviation are output and the record data is processed as a weighted distribution so that a weight of the recent record data is greater than that of the past record data.

(2) A transfer time estimating input data creating function: choose one method from choices a to c (a) Create based on the past record data.

(b) Create based on the past record data and the data (corrected data of the congestion state of the traveling route and the like) at the time of forming the transfer scenario.

(c) Create based on the past record data, the data at the time of forming of the transfer scenario, and predicted data according to the transfer scenario.

The predicted data according to the transfer scenario is used for predicting the congestion state of the traveling route by estimating points and times of future pickup and setting down.

A vehicle allocating function is a function for carrying out vehicle allocation based on the transfer scenario and estimation of the transfer time in order to efficiently carry out the transfer and is achieved by the vehicle allocation processing section 26. This function includes the following elements.

(1) An Empty Transfer Vehicle Estimating Function Based on the Scenario

A function of estimating a point and a time at which the transfer vehicle currently in use becomes empty from the transfer scenario executed by the transfer system in order to efficiently carry out the transfer. The empty transfer vehicle is used for vehicle allocation.

(a) Estimate the time and point (or bay) at which the transfer vehicle becomes empty. For this purpose, the transfer time estimating function is used.

(b) A vehicle allocation executing function (i) In the vehicle allocation control, not all of the transfer vehicles during setting-down traveling toward the bay are counted as the available transfer vehicles to which the transfer instruction can be allocated. This function limits the available vehicles to the transfer vehicles that can finish setting down in a vehicle allocation control term, i.e., a unit term of the vehicle allocation control. The transfer vehicles that finished setting down before the vehicle allocation control term and are traveling around in the bay are targeted for vehicle allocation.

(ii) A point and a time at which the transfer request will be issued in the future, e.g., pickup point and time from a stopover buffer, and a point and a time at which the transfer vehicle currently in transfer traveling will finish setting down and become empty are compared with each other, the points and times predicted from the transfer scenarios. Then, vehicle allocation is carried out by designating the transfer request issued point as a traveling destination after the finish of setting down so that the transfer vehicle currently in transfer traveling can travel to the point by taking the shortest way or the shortest time after the finish of setting down.

(2) A Transfer Request Issue Estimating Function Based on the Scenario

The point and time at which the transfer request will be issued in the future are estimated from the transfer scenarios and especially the transfer scenario in execution and vehicle allocation is carried out so that an empty transfer vehicle arrives at the transfer request issued point at the estimated time.

(a) Estimation of the time when the transfer request is issued

The allocating time setting function in forming of the transfer scenario is used.

(b) Execution of the vehicle allocation (i) The number of transfer requests issued from the bay in the vehicle allocation control term is subtracted from the number of available transfer vehicles calculated in the vehicle allocation control. The remaining number is the net number of available transfer vehicles. To keep this value in a proper range, surplus transfer vehicles are allocated to the intra-bay route or the inter-bay route where the net number of available transfer vehicles is insufficient. If the net number of available transfer vehicles is insufficient, vehicles from other traveling routes are allocated.

(ii) A point and a time at which the transfer request will be issued in the future and a point and a time at which the transfer vehicle currently in transfer traveling will finish setting down and become empty are compared with each other, the points and times predicted from the transfer scenarios. Then, vehicle allocation is carried out so that the transfer vehicle currently in transfer traveling can travel to the transfer request issued point by taking the shortest way or the shortest time after the finish of setting down.

(3) A Function of Estimating Transfer Times for all Transfer Requests

For transfer request for which transfer scenarios are not formed, setting-down finish times are estimated by estimating transfer times, points and times at which the transfer vehicles become empty after the finish of setting down are estimated, and vehicle allocation is carried out in advance.

(a) For estimation of the time when the transfer vehicle becomes empty, the transfer time estimating function is utilized.

(b) Execution of vehicle allocation (i) In the vehicle allocation control, not all of the transfer vehicles during setting-down traveling toward the bay are counted as the available transfer vehicles but only the transfer vehicles that can finish setting down in the vehicle allocation control term are counted.

(ii) A point and a time at which the transfer request will be issued in the future and a point and a time at which the transfer vehicle currently in transfer traveling will finish setting down and become empty are compared with each other, the points and times predicted from the transfer scenarios. Then, vehicle allocation is carried out so that the transfer vehicle currently in transfer traveling can travel to the transfer request issued point by taking the shortest way or the shortest time after the finish of the setting down.

A data managing function is achieved by the data management section 14 and collects, processes, and manages data for supporting the above respective functions.

Basic ideas of the embodiment will be described.

A transfer scenario is formed based on a premise that the transfer time estimated in the transfer time estimation surely or probably becomes reality. If a deviation from the schedule or the like in the scenario arises, a revision is made to achieve the JIT transfer.

Stopover buffer(s) is (are) set provisionally in an order according to a buffer selection logic. If there is a transfer scenario that can achieve the JIT transfer by stopping over at the buffer(s), the scenario is used. If there is no scenario that can achieve it, the stopover buffer(s) is (are) changed.

If it is assumed that the JIT transfer is difficult to achieve, processing as a normal transfer request or the like according to conventional transfer control is performed. In this way, a JIT transfer success rate is increased.

Distribution of the transfer times is estimated from an average value and a variance of the transfer times obtained from past record values and the variance is treated as a risk factor for early arrival or a delay. Based on the estimated value, the transfer scenario is formed.

Revision of the transfer scenario is made immediately before arrival at the transfer destination buffer in the basic transfer "From" (revision 1) and immediately after the finish of setting down at the buffer in the basic transfer "From" (revision 2).

Revision 1: Determine whether to execute the transfer through the stopover buffer(s) according to the assumption made in forming the transfer scenario or to switch to the direct transfer.

Revision 2: Execution timing (allocation timing) is changed based on the latest estimated transfer time for the basic transfer "To".

The above basic ideas may be corrected as follows.

Based on the distribution of the transfer times and a premise that a penalty is minimized, the schedule in the transfer scenario is made and the transfer scenario is revised. The penalty is evaluated based on a composition product and the like of a distribution of arrival times and an evaluation function (penalty function).

Achievement of the JIT transfer is determined to be difficult based on a fact that a penalty expected value at the transfer source or the transfer destination is greater than or equal to a predetermined value for an arbitrary stopover buffer in a range of the buffer selection logic.

As the basic transfer processing start timing, optimum timing with which the penalty becomes minimum is selected in consideration of the distribution of the transfer times.

If the transfer scenario fixed to minimize the transfer source/destination penalty is difficult to achieve because the stopover buffer is occupied, another stopover buffer is used.

Figure 6:
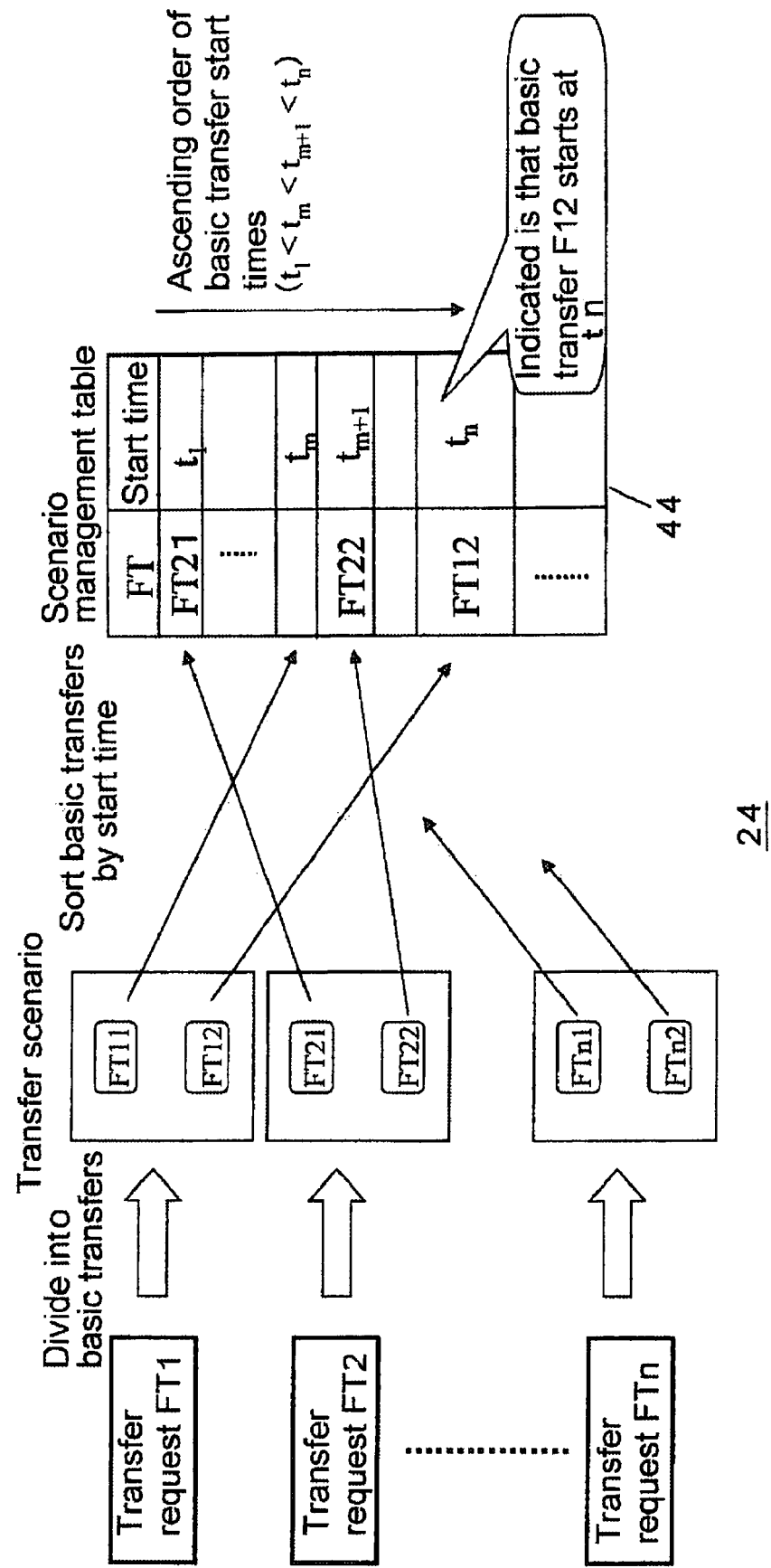
FIG. 6 is a view showing management of the transfer scenario in the embodiment.

FIG. 6 shows a management table 44 of the transfer scenario in the transfer scenario execution management section 24. As already described, the JIT transfer request is divided into two basic transfers (FT11, FT12, and the like), for example, and the transfer scenarios formed in the transfer scenario forming section 20 are stored in the transfer scenario execution management section 24. A table in which the respective basic transfers are sorted by the start time (allocation timing) is the transfer scenario management table 44. In the table 44, IDs and the start times of the respective basic transfers are recorded and a meaning of the start time is illustrated in the transfer scenario 40 in FIG. 3.

Figure 7:
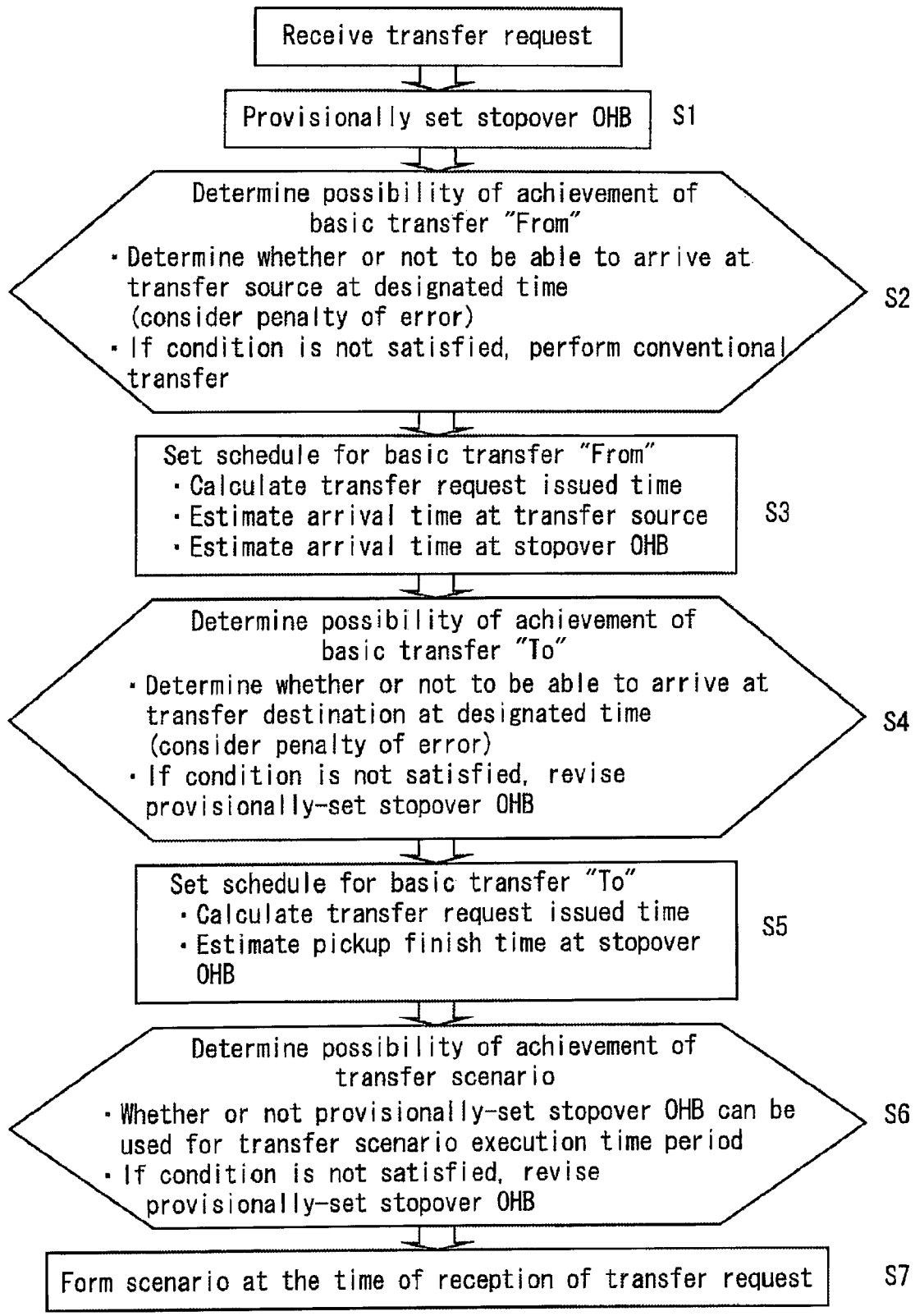
FIG. 7 is a flow chart showing a forming algorithm of the transfer scenario in the embodiment.
Figure 8:
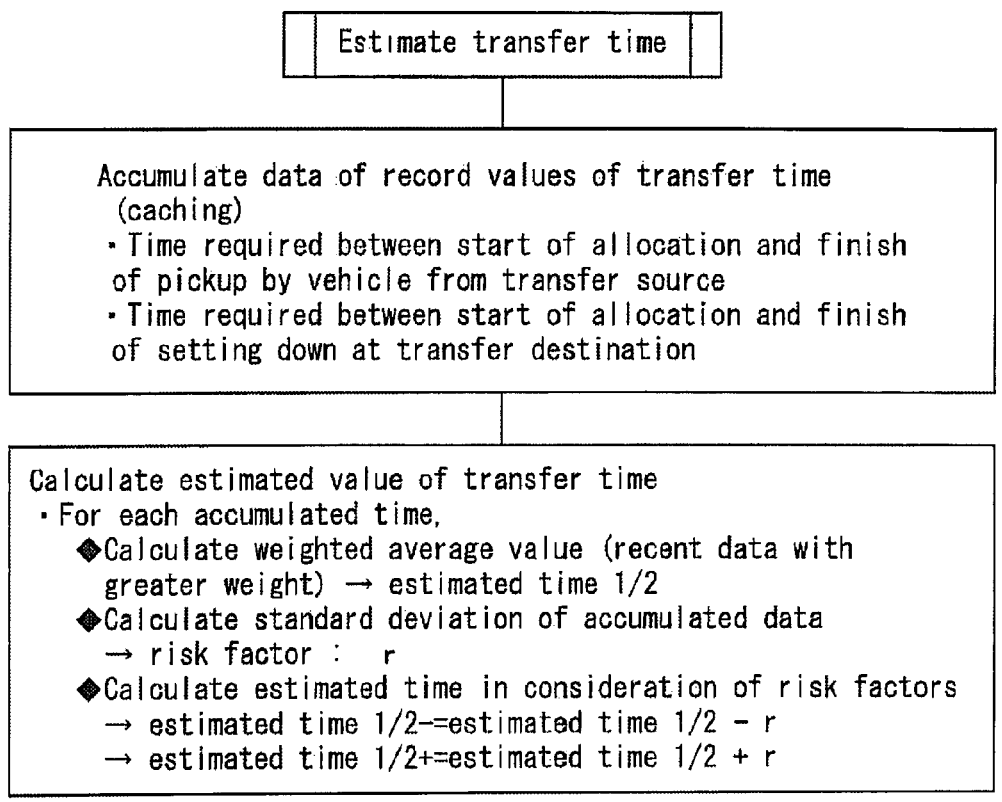
FIG. 8 is a flow chart showing an estimation algorithm of a transfer time in the embodiment.

FIG. 7 shows a transfer scenario forming algorithm. Assumptions are made that a JIT transfer request has been received from a production controller and that arrival times are designated for both basic transfer "From" and basic transfer "To". If the arrival time is designated for only one of them, the transfer scenario conforming to the JIT may be formed for it. If a JIT transfer is designated for the basic transfer "To", an arrival time at a stopover buffer (stopover OHB) has to be before a pickup time from the stopover OHB in the basic transfer "From".

In step 1, the stopover OHB is set provisionally. It is a buffer through which the article can be transferred to a transfer destination loading and unloading port in the shortest time. In step 2, possibility of achievement of the basic transfer "From" is determined. In other words, whether or not a transfer vehicle can arrive at a transfer source loading and unloading port at a designated time is determined. If a penalty function is given, whether or not an evaluation value in the penalty function is greater than or equal to a predetermined value is evaluated. It is possible to set a stopover buffer a standard deviation (risk factor) of a transfer time from which to the transfer destination loading and unloading port is in a range of a predetermined time. If the basic transfer "From" is possible, a schedule for the basic transfer "From" is set (step 3). In the schedule, a transfer request issued time (allocating time to the transfer vehicle) is calculated and it is calculated so that the transfer vehicle arrives at the transfer source at the designated time with the evaluation value of the penalty function not over the predetermined value. Based on this, an arrival time at the stopover buffer is estimated. In step 4, possibility of achievement of the basic transfer "To" is determined, that is determination whether or not the transfer vehicle can arrive from the stopover buffer at the transfer destination loading and unloading port at a designated time with an evaluation value of the penalty function not over a predetermined value. Evaluation of the penalty function may be omitted and only an average of arrival times may be estimated.

If the distribution of the transfer times of the basic transfer "To" is wide due to a distance or the like of the stopover buffer from the transfer destination loading and unloading port, the evaluation value of the penalty function may become greater or equal to the predetermined value. In this case, the stopover buffer is revised and, with this revision, the scenario for the basic transfer "From" is also changed. If the basic transfer "To" is possible, a schedule for it is set in step 5. From a designated time when the transfer vehicle should arrive at the transfer destination, a time when the transfer vehicle should finish pickup at the stopover buffer, a time when the transfer vehicle should arrive at the stopover buffer, and a time when a transfer instruction should be allocated to the transfer vehicle are calculated back. Next, in step 6, whether or not the provisionally-set stopover buffer can be used for a necessary time period in a transfer scenario execution time period. If it cannot be used, the processing returns to step 1 where the stopover buffer is revised and the items of processing in step 2 and steps after that are repeated. The schedule obtained by the above processing is stored to finish forming of the transfer scenario (step 7).

Figure 9:
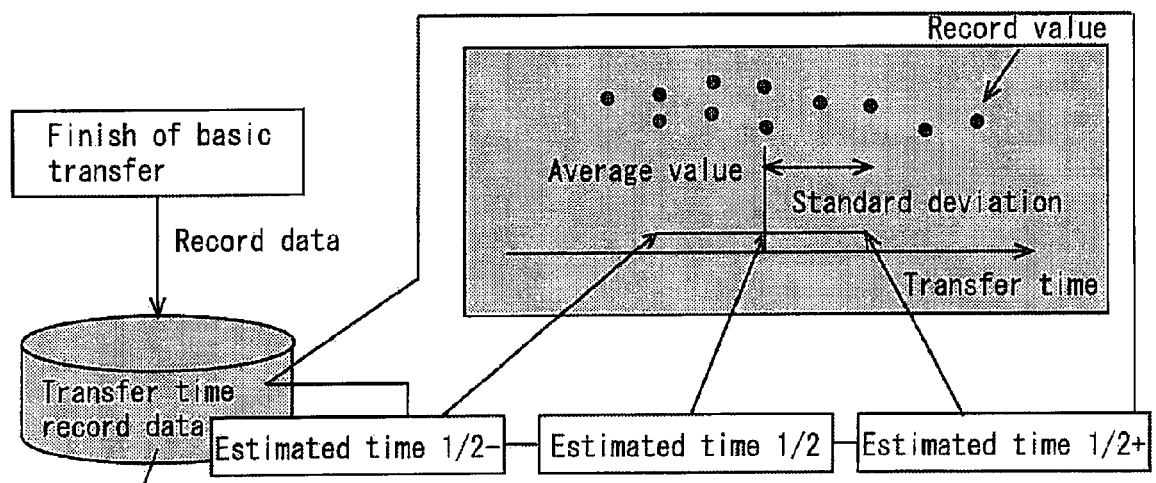
FIG. 9 is a view schematically showing data in a transfer time record database in the embodiment.

FIGS. 8 to 12 show an estimation algorithm of a transfer time. As a basis of estimation of the transfer time, data of record values of the transfer time is accumulated and stored in a database 46 in FIG. 9. There are two kinds of transfer times, i.e., time between allocation of the transfer vehicle and completion of pickup at the transfer source and time between allocation of a transfer to the transfer destination and the finish of setting down. From the accumulated transfer times, an average transfer time is calculated. The average may be a simple average value but is preferably a weighted average value so that a weight of the recent data becomes greater. Moreover, a standard deviation or the like is calculated as distribution of the transfer times. In calculation of the standard deviation, it is preferable that a weight of the recent data is greater. Next, based on the standard deviation, a risk factor +r and a risk factor −r representing variation in the transfer time are obtained. The risk factors +r, −r are the standard deviation itself or the double of it. If the distribution of the arrival times is different from a normal distribution, the risk factor −r indicating early arrival and the risk factor +r indicating late arrival may be different values from each other. In this way, as an estimated value of the transfer time, an intermediate value, the risk factor +r, and the risk factor −r are obtained. FIG. 9 is a diagrammatic illustration of the processing in FIG. 8.

FIG. 10 shows an example in which data of inter-point traveling velocity of the traveling vehicle is collected and an average and a variance (standard deviation) of the end-to-end traveling time is calculated. Data of inter-point traveling velocity of each transfer vehicle is collected in step 10 and the inter-point traveling time is calculated from the inter-point distance and traveling velocity in step 11. If an assumption is made that the inter-point traveling velocity is independent of another inter-point traveling velocity, an average and a variance of the inter-point traveling times are calculated in step 12 and an inter-point traveling time and a variance are predicted by means of exponential smoothing using past record data as initial values or a Kalman filter technique in step 13. The average and the variance of the end-to-end (e.g., from a current position of the transfer vehicle to a pickup point, or from a pickup point to a setting-down point) traveling times can be obtained by respectively adding the inter-point traveling time and the variance (step 14).

If an inter-point traveling velocity correlates with an adjacent inter-point traveling velocity, a covariance of an average of the inter-point traveling times and an adjacent inter-point traveling time is calculated in step 15, the inter-point traveling time and the covariance is similarly predicted in step 16, and an average and a variance of end-to-end traveling times are calculated in step 17.

FIGS. 11 and 12 show a calculation algorithm of an average and a variance of inter-point traveling times from data collected in a term T, that is used for sorting data. Inter-point traveling times are collected from each transfer vehicle in step 20 and traveling times from the data collected in the term T are sorted according to pairs of points in step 21. The data sorted in this manner is shown in an upper right part of FIG. 11. Next, an averages and a variance of inter-point traveling times are calculated based on data collected for each point pair (step 22). Data obtained in this manner is shown in a middle right part of FIG. 11. In step 23, an average of traveling times to a transfer source is predicted by means of exponential smoothing, for example. A predicted value of an average of traveling times at a point i and a point j in a term T+1 is determined by the sum of a product obtained by multiplying a predicted value of an average in a term T−1 by a coefficient α and a product obtained by multiplying a record average of traveling times between the points i and j in a term T by (1−α). An example of prediction of the traveling time between the points in this case is shown in a lower right part of FIG. 11.

Moving on to FIG. 12 from a connector A, a variance of the inter-point traveling times is predicted by means of exponential smoothing. A predicted value of a variance of the traveling times between the point i and the point j in the term T+1 is determined by the sum of a product obtained by multiplying a predicted value of a variance in the term T by a coefficient α and a product obtained by multiplying a record value of the variance in the term T by a coefficient (1−α). If the traveling time between the points can be assumed to be independent (step 25), an average and a variance of end-to-end traveling times can be predicted from predicted values of the average and the variance of the inter-point traveling times. An example of prediction of the average value and the variance of the traveling times is shown on a right side in FIG. 12.

FIG. 13 shows examples of penalty functions for time differences of the finish of pickup and the finish of setting down from designated time periods in the JIT transfer request. The penalty function is zero when the transfer is finished in the designated time period and the penalty increases with the time difference from the designated time period, for example. The penalty may symmetrically increase in earlier and later cases than the designated time period. Alternatively, the penalty may be greater in the later setting down than in the earlier one with respect to the designated time period and the penalty may be greater in the earlier pickup with respect to the designated time period, for example. However, in a case of trying to carry out setting down or pickup earlier than the designated time period, the transfer vehicle may wait before the loading and unloading port and does not hinder the JIT transfer itself. In this case, the penalty actually means a penalty for congestion in the traveling route due to stopping of the transfer vehicle.

FIG. 14 shows calculation of an evaluation value for evaluating possibility of achievement of the basic transfer. If assumptions are made that a penalty function g (t) is given as shown on the right side in FIG. 14 and that distribution of times at which empty transfer vehicle arrives at a transfer source is fli(t) (e.g., normal distribution estimated from the risk factors), it is possible to obtain the evaluation value C1(T) from a composition product. Then, if there is a transfer vehicle with an evaluation value C1(T) not over a predetermined value, the basic transfer "From" can be achieved. If there are a plurality of available transfer vehicles, evaluation values of the respective transfer vehicles are obtained and the basic transfer "From" is allocated to the transfer vehicle with the smallest evaluation value. Although the evaluation value of the arrival time at the transfer source is calculated in FIG. 14, an evaluation value of a setting-down time at a transfer destination is calculated in the same way. In evaluation of the penalty, the sum of evaluation values g(τ+r)+g(τ−r) at estimated arrival times τ+r, τ−r (+r, −r are risk factors) may be used, for example.

Figure 15:
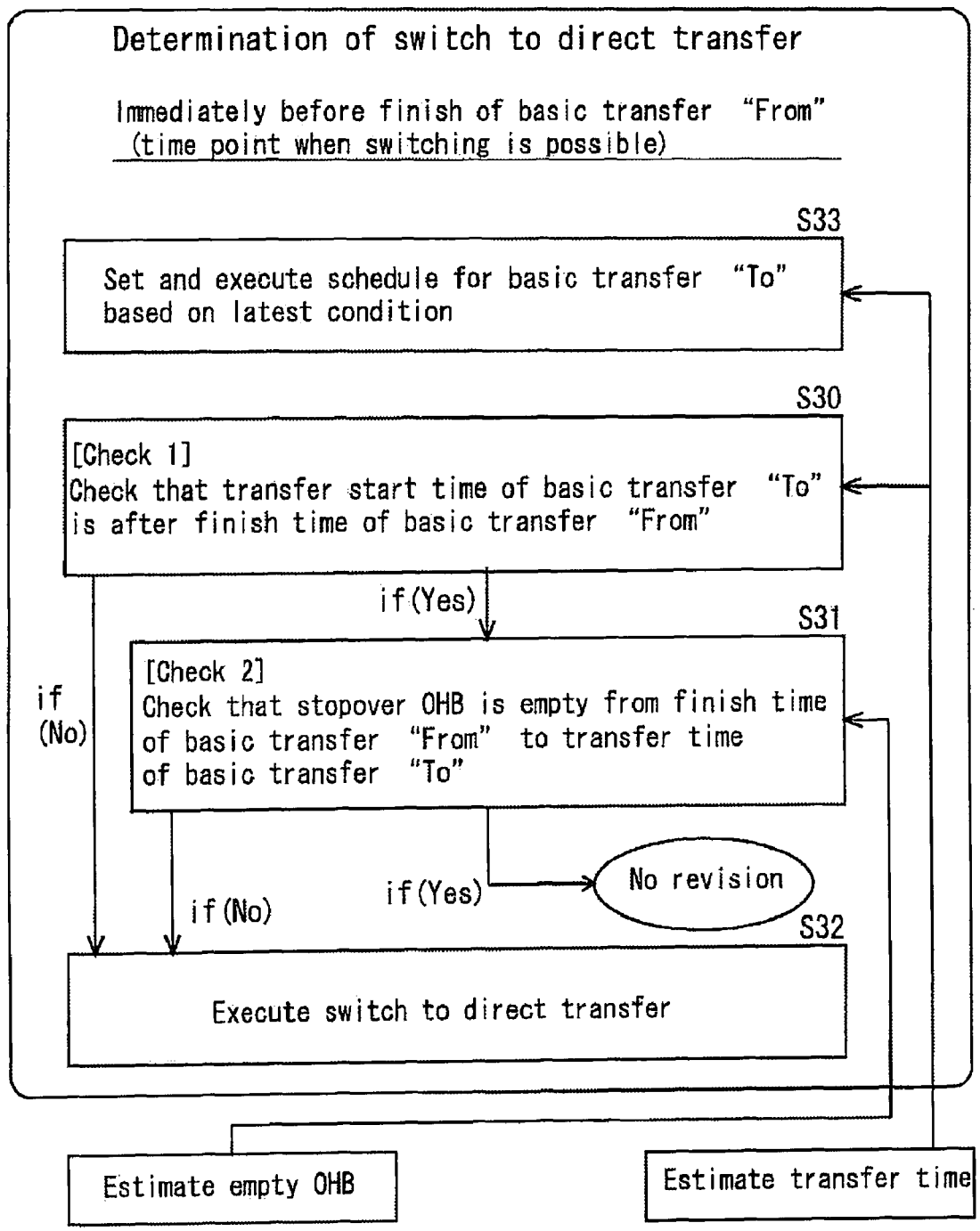
FIG. 15 is a view showing an algorithm for switching from just-in-time transfer to a direct transfer in the embodiment.

The transfer scenario execution management section 24 in FIG. 1 determines whether to separately execute the basic transfer "To" or to switch to the direct transfer immediately before the finish of the basic transfer "From" so that JIT transfer can be achieved in the event of congestion in the traveling route and in any other unexpected events. A switching algorithm to the direct transfer is shown in FIG. 15. In step 30, whether the transfer of the basic transfer "To" is started after the finish time of the basic transfer "From" is checked. In a case of "YES", whether the stopover buffer is empty until pickup is carried out in the basic transfer "To" after the finish of the basic transfer "From" is checked in step 31. In a case of "NO" in one of step 30 and step 31, the switch to the direct transfer is made (step 32). In this case, the transfer vehicle that is carrying out the basic transfer "From" continues to travel to the setting-down destination of the basic transfer "To" and carries out setting down at the designated time. Because the transfer vehicle arrives at the setting-down destination before the designated time, processing such as waiting before the setting-down destination and delaying of the arrival time by changing the traveling route is performed according to a predetermined value if the evaluation value in FIG. 14 is greater than or equal to the predetermined value. Even in a case where the switch to the direct transfer is made, the production controller is informed of impossibility of the JIT transfer if the evaluation value of the arrival time at the setting-down destination is greater than or equal to the predetermined value. Furthermore, in step 33, the schedule for the basic transfer "To" is reset based on the latest conditions. For this processing, availability of the buffer is estimated by using data in the buffer management section and the latest transfer time is estimated by utilizing data in the transfer time estimation section.

FIG. 16 shows an example of an overhead buffer management table 48. If buffers other than overhead buffers are used, similar management tables are provided for such buffers. In FIG. 16, a current time is t2 and data at and after t3 are predicted values. The table is divided into sections for respective buffer shelves. For each shelf, ID of a transfer request that is using the shelf, the fact that the shelf is empty, or ID of a transfer request that has reserved the shelf is recorded.

Figure 17:
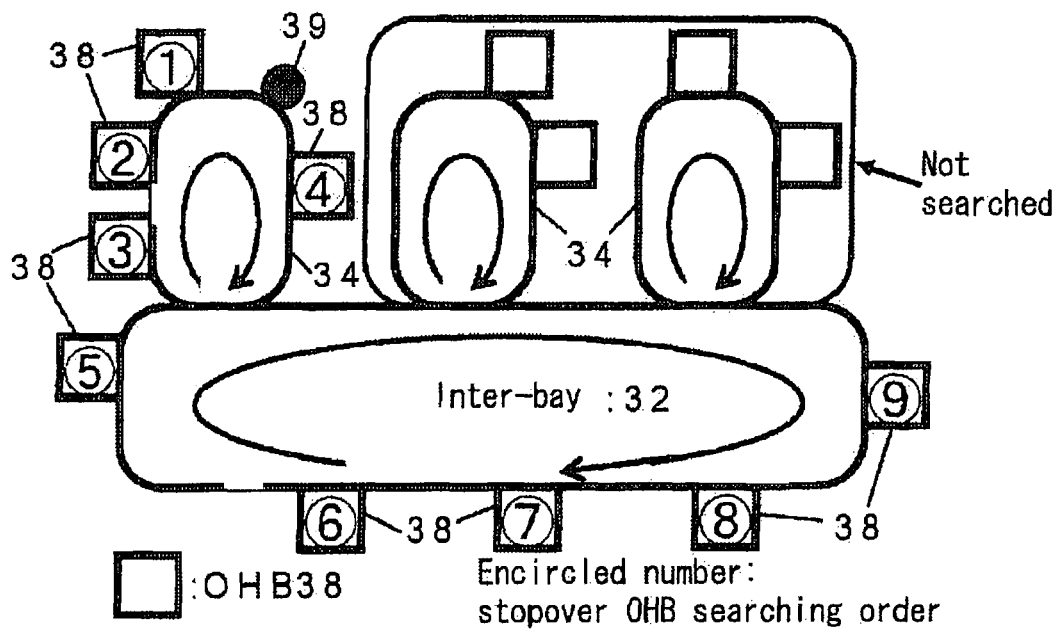
FIG. 17 is a view schematically showing a searching order for an empty buffer in the embodiment.

FIG. 17 shows a search algorithm for a stopover buffer for a transfer destination 39 on the intra-bay route 34. The overhead traveling vehicle travels around in one direction on the traveling routes 32, 34 and can freely travel back and forth between the inter-bay route 32 and the intra-bay route 34. Therefore, the same bay is searched for an empty buffer (buffer that is empty for the scheduled time of use), starting from the immediately upstream one to the transfer destination loading and unloading port 39 and then going on to more upstream ones. If no suitable empty buffer can be found, the inter-bay route 32 is searched for an empty buffer that is on an upstream side of the intra-bay routes 34 including the transfer destination 39.

Figure 18:
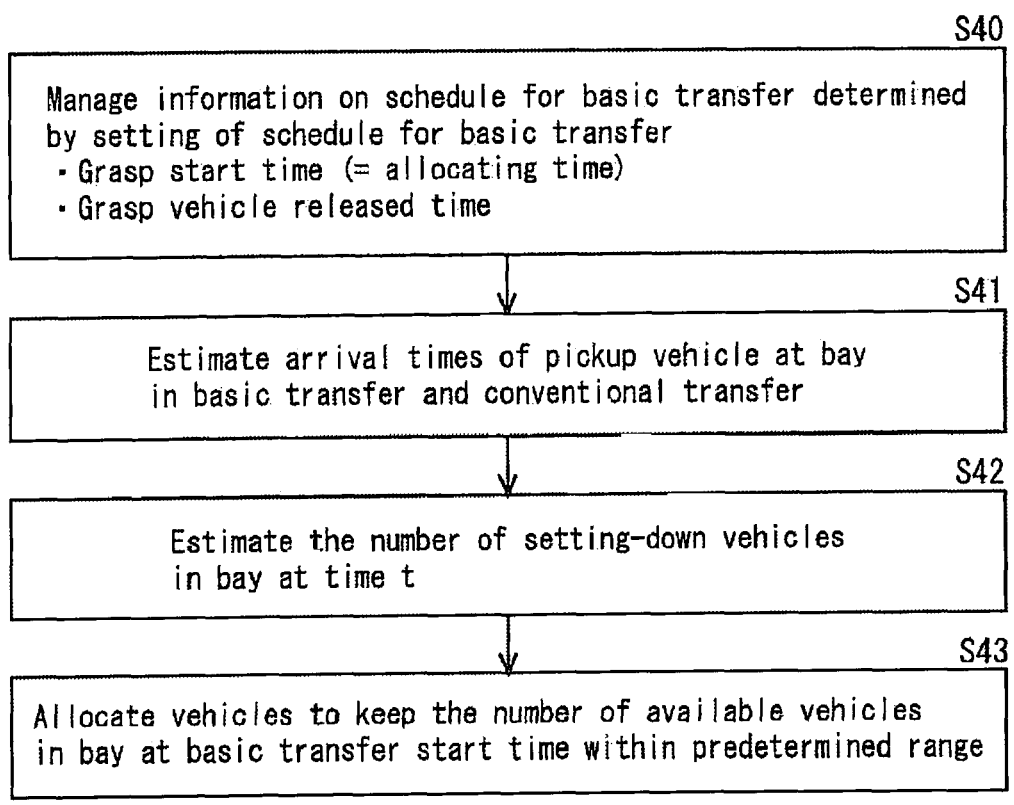
FIG. 18 is a flow chart showing a vehicle allocation algorithm in the embodiment.

FIGS. 18 and 19 show a vehicle allocation algorithm in the embodiment and a management table 50 of the number of allocated vehicles and used for the algorithm. Based on the schedule of the basic transfer, the number of vehicles to which the transfer instructions should be allocated in each bay at each time is grasped. Moreover, the number of vehicles that have finished setting down and become empty in each bay is also grasped (step 40). In step 41, the number of vehicles necessary for pickup in the bay at a certain time and arrival times are estimated in each case of the basic transfer and the conventional transfer. Furthermore, the number of vehicles that become empty due to setting down within the same bay at a time immediately before the time is estimated, for example (step 42). A unit of time is the term based on which the vehicle allocation is carried out and the transfer times are estimated. If a cumulative total of the number of vehicles for carrying out pickup is subtracted from a cumulative total of the number of vehicles that become empty, the number of transfer vehicles to which the transfer instructions can be allocated freely in the bay is obtained and the vehicle allocation is carried out so that the number is in a predetermined range (step 43).

In FIG. 19, the number of vehicles that arrive for pickup at each time is predicted for each bay at an upper left part. At an upper right part, the number of vehicles that finish setting down and become empty at each time is predicted for each bay. From a difference between them, the number of empty vehicles (the number of available transfer vehicles) to which the transfer instructions can be allocated in each bay at each time is predicted. If the number of available transfer vehicles is smaller than a predetermined value, e.g., a minus number, the empty transfer vehicles are called into the bay. If the number of available transfer vehicles exceeds the predetermined value, the transfer vehicles are moved to other bays.

Figure 20:
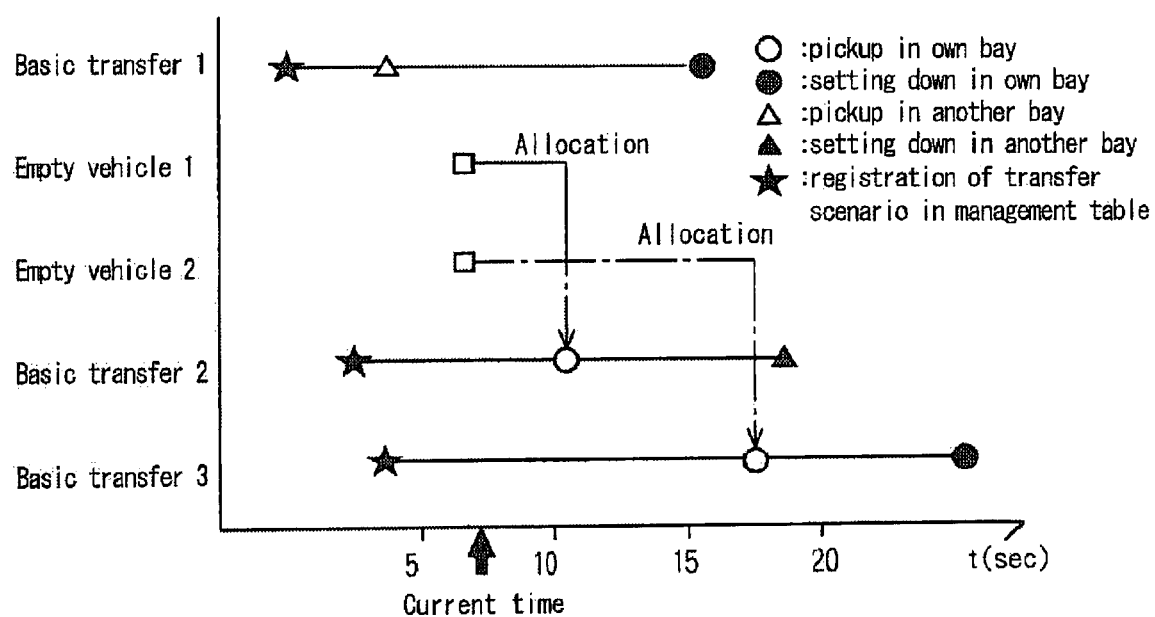
FIG. 20 is a graph schematically showing vehicle allocation control in the embodiment.

FIG. 20 shows the vehicle allocation algorithm in the embodiment for one bay. Here, the vehicle allocation control term T is 5 seconds, for example, there are two empty vehicles, i.e., an empty vehicle 1 and an empty vehicle 2, at a current time, and allocation of vehicles necessary for times 15 to 20 seconds that is two terms after the current term, for example, is prepared. Because one empty vehicle is necessary in a basic transfer 2 at times 10 to 15 seconds in the next term, the empty vehicle 1 is allocated to this. Because another empty vehicle is necessary at the times 15 to 20 seconds, the empty vehicle 2 is allocated to this. Because a basic transfer 1 is finished and one empty vehicle becomes available in the own bay in the same term, the number of available transfer vehicles at the times 15 to 20 seconds is the basic transfer 1+the empty vehicle 2−a basic transfer 3=1. To keep this value in a proper range, surplus transfer vehicles are expelled into other bays or the like and a transfer vehicle for satisfying a need is called from another bay or the like. Although management of the number of available transfer vehicles for the JIT transfer is shown here, it is possible to prepare a transfer vehicle in advance by the vehicle allocation control for every transfer if a time at which the transfer vehicle becomes empty due to setting down and a time at which an empty vehicle becomes necessary for pickup can be predicted for the transfer. Even if the time at which the transfer vehicle carries out pickup cannot be predicted, a time at which a transfer vehicle becomes empty due to setting down in response to an already allocated transfer instruction can be predicted. Therefore, if the number of vehicles that become empty in a certain bay in a control term is large, the empty vehicles can be expelled. If the number is small, it is possible to call an empty vehicle from another bay.

Figure 21:
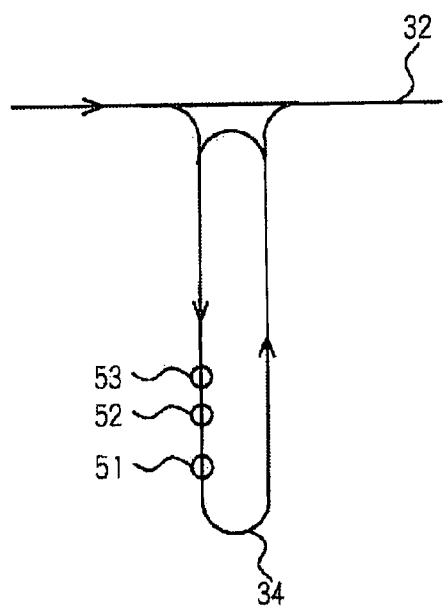
FIG. 21 is a view schematically showing a situation where there are a plurality of traveling destinations within a same bay in the embodiment.
Figure 22:
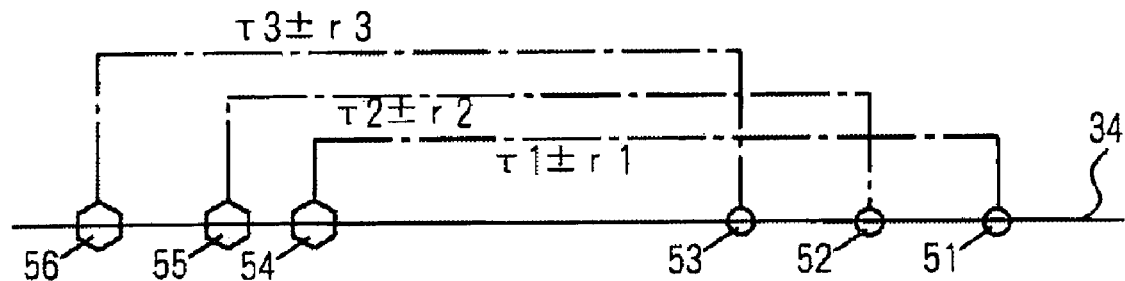
FIG. 22 is a view schematically showing positional relationships between destination points and transfer vehicles in the case of FIG. 21.

FIGS. 21 and 22 show an allocation order of the transfer instructions such as basic transfer instructions in a case where there are a plurality of destination points within the same bay. The destination points are points for pickup or points or setting down and destination points 51 to 53 are shown as examples in FIGS. 21 and 22. If the transfer instructions are allocated to overhead traveling vehicles 54 to 56 in FIG. 22, the leading downstream overhead traveling vehicle 54 is allocated to the downstream destination point 51, the intermediate overhead traveling vehicle 55 is allocated to the intermediate destination point 52, and the upstream overhead traveling vehicle 56 is allocated to the upstream destination point 53 in the intra-bay routes 34 so as not to cause congestion in the intra-bay route 34. If estimated values of traveling times to the respective points are $\tau 1 \pm r1, \tau 2 \pm r2$, and $\tau 3 \pm r3$ and if the overhead traveling vehicles 54 to 56 start traveling to the destination points 51 to 53 immediately after the transfer instructions are allocated to them, the respective sum of the allocating times and $\tau 1, \tau 2$, and $\tau 3$ and their distributions $\pm r1$ to $r3$ need satisfy predetermined conditions in a case where there are designated values of the arrival times.

Figure 23:
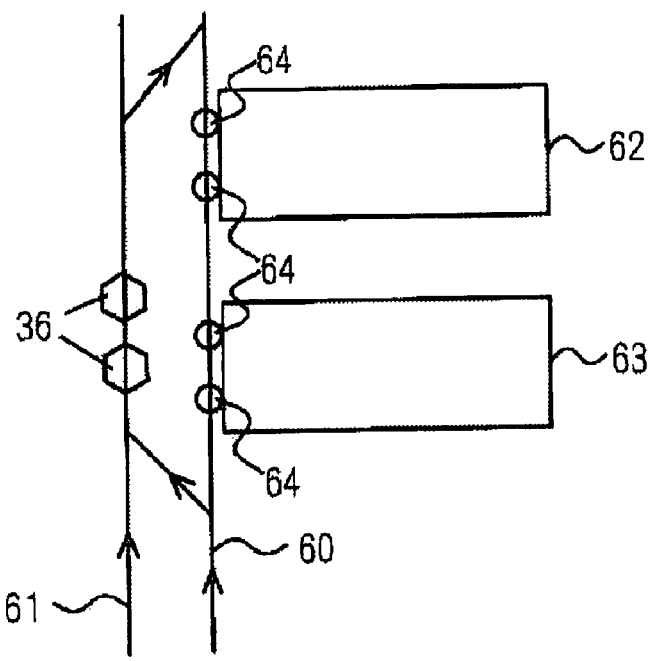
FIG. 23 is a view showing examples of waiting positions of the transfer vehicles in the embodiment.

FIG. 23 shows an example of waiting positions in the vehicle allocation, where the intra-bay route 34 has two tracks and is formed of two parallel traveling rails 60, 61 oriented in the same direction. If overhead traveling vehicles 36 are allocated to wait on the traveling rail 61 on an opposite side to loading and unloading ports 64 provided to processing devices 62, 63, they do not obstruct the traveling rail 60 in a way they hinder pickup and setting down of other overhead traveling vehicles at the loading and unloading ports.

Although the respective processing devices and the respective bays have been described as equals in the embodiment, there may be important bays and unimportant bays or important processing devices and unimportant processing devices. In this case, scenarios of JIT transfers are preferentially formed for the important processing devices and bays.

At the time of vehicle allocation, it is necessary to predict the number of vehicles that become empty in the bay. Although the number of overhead traveling vehicles in the vehicle allocation term is predicted from the number of transfer instructions in execution, it is easier to obtain the number of overhead traveling vehicles existing in the bay or, as an approximate number, the number of transfer instructions in execution and using points in the bay as "From" positions or "To" positions, or the number of transfer instructions in execution and using points in the bay as "To" positions.

The invention claimed is:
1. A transfer system, comprising:
a plurality of transfer vehicles transferring an article between a plurality of processing devices,
a buffer storing the article transferred between the processing devices,
a controller allocating article transfer instructions to the transfer vehicles,
transfer instruction forming means for forming a first transfer instruction from a transfer source processing device to a stopover buffer and for forming a second transfer instruction from the stopover buffer to a transfer destination processing device in response to a transfer request with a designated arrival time at the transfer destination processing device, and allocation means for obtaining a time to start traveling of the transfer vehicle and for allocating the second transfer instruction to the transfer vehicle at the time so that the article arrives at the transfer destination processing device at the designated arrival time, wherein the buffers are provided in a plurality of positions along a traveling route for the transfer vehicles, the transfer instruction forming means dividing the second transfer instruction into a plurality of parts so as to transfer the article to the transfer destination processing device via the plurality of stopover buffers, wherein the allocation means obtains times to start the traveling of the transfer vehicles for the respective parts of the second transfer instruction so that the article arrives at the respective stopover buffers before pickup times of the article from the stopover buffers and so that the article arrives at the transfer destination processing device at the designated time, and wherein the allocation means allocates the respective parts of the second transfer instruction to the transfer vehicles according to the times.

2. A transfer system according to claim 1,
wherein the transfer instruction forming means selects the stopover buffers from the buffers according to a predetermined condition.

3. A transfer system according to claim 1, further comprising:
revising means for determining whether or not the article can arrive at the transfer destination processing device at the designated arrival time according to an execution status of the first transfer instruction or a condition of the transfer system, and for correcting the second transfer instruction when the article cannot arrive at the transfer destination processing device at the designated arrival time.

4. A transfer system according to claim 1, further comprising:
predicting means for predicting a time at which the article will arrive at the transfer destination processing device and for predicting distribution of the arrival time, and
evaluating means for evaluating an expected value of a deviation from a designated arrival time based on the predicted arrival time and distribution of the arrival time,
wherein the transfer instruction forming means forms the second transfer instruction so that an evaluation satisfies a predetermined condition.

5. A transfer method, comprising:
transferring an article between a plurality of processing devices by a plurality of transfer vehicles,
temporarily storing the article transferred between the processing devices in a buffer,
allocating an article transfer instruction to the transfer vehicles by a controller,
preparing the controller including transfer instruction forming means and allocation means, forming by the transfer instruction forming means a first transfer instruction from a transfer source processing device to a stopover buffer and a second transfer instruction from the stopover buffer to a transfer destination processing device in response to a transfer request with an designated arrival time at the transfer destination processing device, and obtaining by allocation means a time to start traveling of the transfer vehicle and allocating by the allocation means the second transfer instruction to the transfer vehicle at the time so that the article arrives at the transfer destination processing device at the designated arrival time, wherein the buffers are provided in a plurality of positions along a traveling route for the transfer vehicles, the transfer instruction forming means dividing the second transfer instruction into a plurality of parts so as to transfer the article to the transfer destination processing device via the plurality of stopover buffers, wherein the allocation means obtains times to start the traveling of the transfer vehicles for the respective parts of the second transfer instruction so that the article arrives at the respective stopover buffers before pickup times of the article from the stopover buffers and so that the article arrives at the transfer destination processing device at the designated time, and wherein the allocation means allocates the respective parts of the second transfer instruction to the transfer vehicles according to the times.

6. The method of claim 5,
wherein the transfer instruction forming means selects the stopover buffers from the buffers according to a predetermined condition.

7. The method of claim 5, further comprising:
determining whether or not the article can arrive at the transfer destination processing device at the designated arrival time according to an execution status of the first transfer instruction or a condition of the transfer system, and
correcting the second transfer instruction when the article cannot arrive arrive at the transfer destination processing device at the designated arrival time.

8. The method of claim 5, further comprising:
predicting a time at which the article will arrive at the transfer destination processing device and distribution of the arrival time, and
evaluating an expected value of a deviation from a designated arrival time based on the predicted arrival time and distribution of the arrival time,
wherein the transfer instruction forming means forms the second transfer instruction so that an evaluation satisfies a predetermined condition.

* * * * *